(12) United States Patent
Yamada et al.

(10) Patent No.: US 11,107,260 B2
(45) Date of Patent: Aug. 31, 2021

(54) IMAGE PROCESSING APPARATUS, CONTROL METHOD, AND STORAGE MEDIUM

(71) Applicant: CANON KABUSHIKI KAISHA, Tokyo (JP)

(72) Inventors: Takayuki Yamada, Kawasaki (JP); Shinjiro Hori, Yokohama (JP); Hiroyasu Kunieda, Yokohama (JP); Mitsuru Uratani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 16/787,401

(22) Filed: Feb. 11, 2020

(65) Prior Publication Data

US 2020/0279425 A1 Sep. 3, 2020

(30) Foreign Application Priority Data

Feb. 28, 2019 (JP) .............................. JP2019-036830

(51) Int. Cl.
*G06T 11/60* (2006.01)
*G06T 7/00* (2017.01)
*G06K 9/62* (2006.01)

(52) U.S. Cl.
CPC ............ *G06T 11/60* (2013.01); *G06K 9/6201* (2013.01); *G06T 7/0002* (2013.01); *G06T 2207/30168* (2013.01)

(58) Field of Classification Search
CPC .......... G06K 9/00288; G06K 9/00684; G06K 9/036; G06K 9/6201; G06T 11/60; G06T 2207/30168; G06T 7/0002
See application file for complete search history.

(56) References Cited

U.S. PATENT DOCUMENTS

| 8,891,883 | B2 | 11/2014 | Murphy-Chutorian et al. |
| 10,366,520 | B2 | 7/2019 | Hayakawa |
| 2013/0294709 | A1* | 11/2013 | Bogart ..................... G06T 7/00 382/284 |
| 2017/0186201 | A1* | 6/2017 | Obayashi ........... H04N 1/00442 |
| 2020/0104576 | A1 | 4/2020 | Usuki et al. |

FOREIGN PATENT DOCUMENTS

JP 2016066328 A 4/2016

* cited by examiner

*Primary Examiner* — Manuchehr Rahmjoo
(74) *Attorney, Agent, or Firm* — Canon U.S.A., Inc, IP Division

(57) ABSTRACT

A control method for an image processing apparatus that generates a plurality of pieces of album data corresponding to a plurality of albums includes automatically selecting at least one piece of image data out of a plurality of pieces of image data as common image data corresponding to an image to be placed in a common page, which is a page common to all of the plurality of albums, based on an evaluation that is based on a first factor, and automatically selecting at least one piece of image data out of the plurality of pieces of image data as individual image data corresponding to an image to be placed in an individual page, which is a page not common to all of the plurality of albums, based on an evaluation that is based on a second factor.

20 Claims, 16 Drawing Sheets

FIG.6

| SCENE | IMAGE CAPTURING PERIOD (HOURS) | | NUMBER OF CAPTURED IMAGES (IMAGES) | | NUMBER OF PERSONS SUBJECTED TO IMAGE CAPTURING (PERSONS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.9
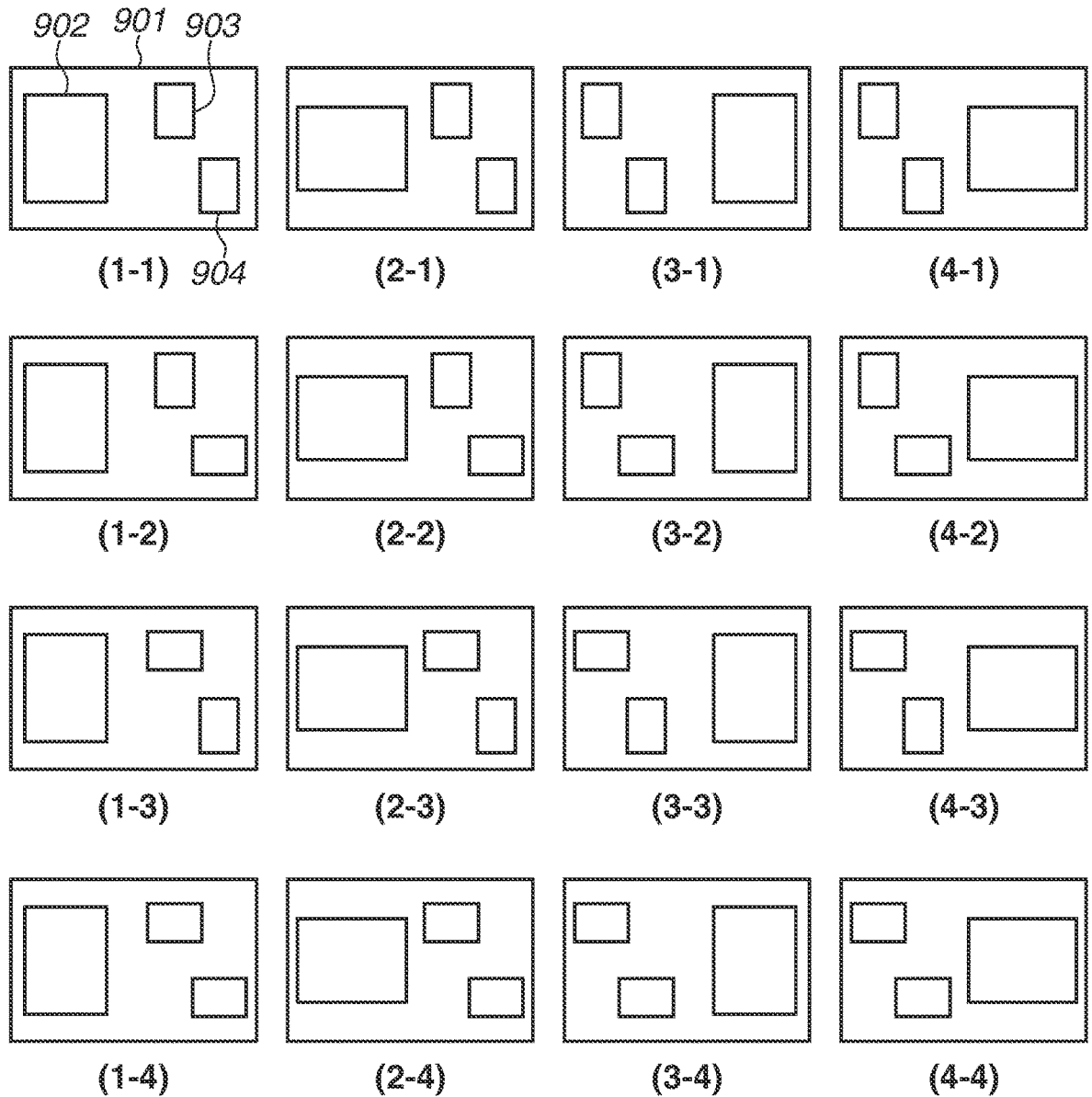
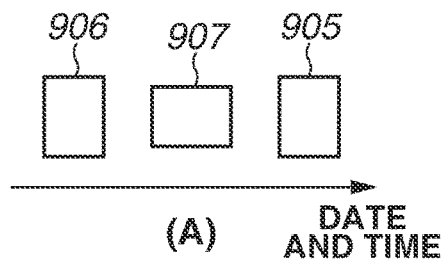

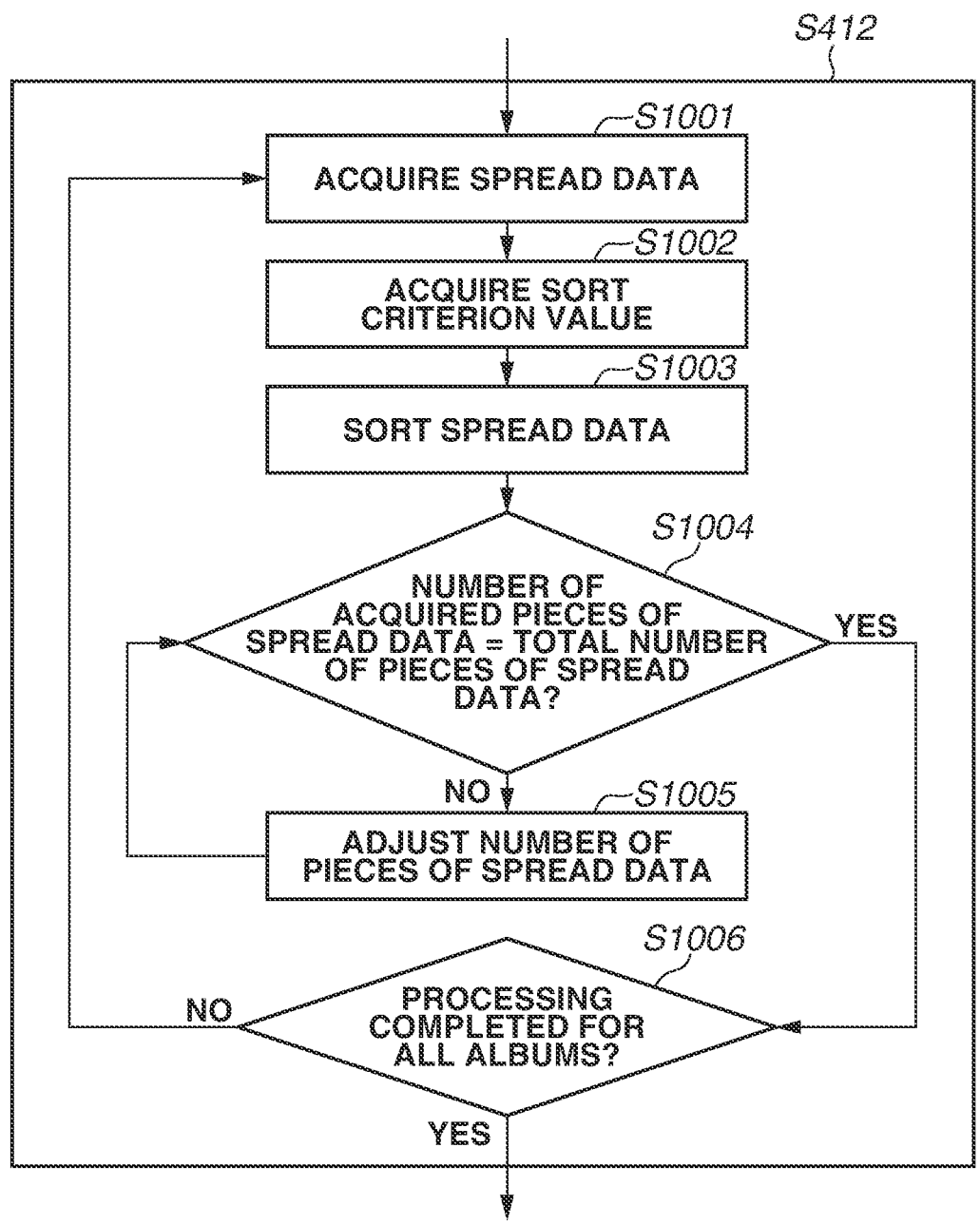

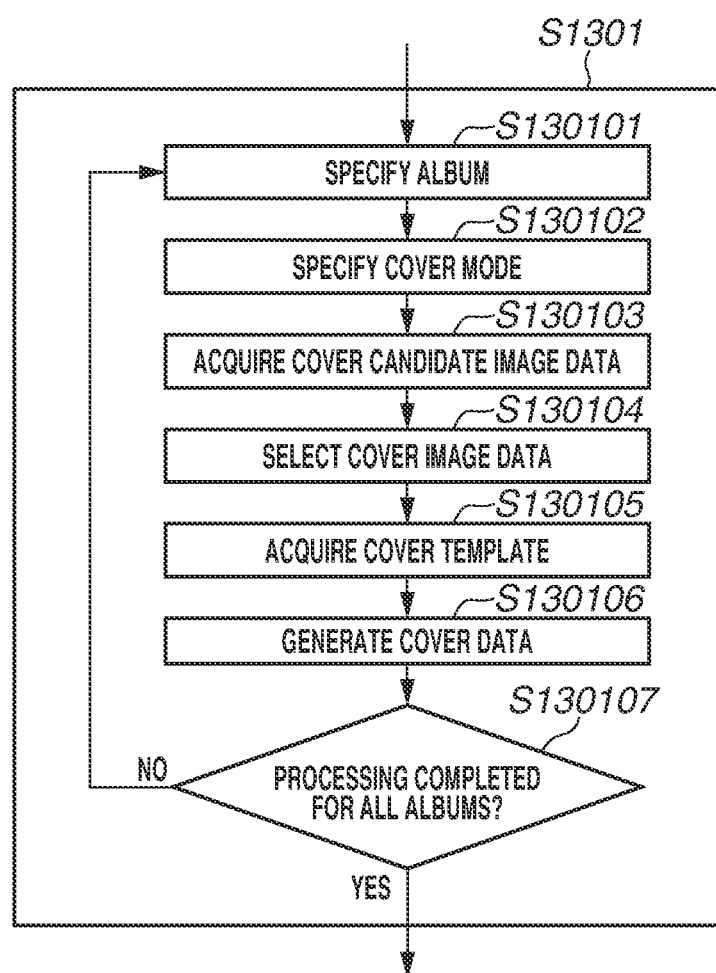

IMAGE PROCESSING APPARATUS, CONTROL METHOD, AND STORAGE MEDIUM

BACKGROUND OF THE INVENTION

Field of the Invention

Aspects of the present invention generally relate to an image processing apparatus, a control method, and a storage medium.

Description of the Related Art

In recent years, there have been known methods for generating album data used to output an album in which images are arranged. Japanese Patent Application Laid-Open No. 2016-66328 discusses a method in which a plurality of users edit album data in collaboration with each other.

However, Japanese Patent Application Laid-Open No. 2016-66328 does not take into consideration processing which is performed to generate a plurality of pieces of album data including a common page, which is a page common to all of the plurality of pieces of album data, and an individual page, which is a page not common to all of the pieces of album data.

SUMMARY OF THE INVENTION

Aspects of the present disclosure are generally directed to appropriately generating a plurality of pieces of album data including a common page, which is a page common to all of the plurality of pieces of album data, and an individual page, which is a page not common to all of the pieces of album data.

According to an aspect of the present disclosure, a control method for an image processing apparatus that generates a plurality of pieces of album data corresponding to a plurality of albums includes acquiring a plurality of pieces of image data, evaluating each of the plurality of pieces of image data based on a first factor, evaluating each of the plurality of pieces of image data based on a second factor different from the first factor, automatically selecting at least one piece of image data out of the plurality of pieces of image data as common image data corresponding to an image to be placed in a common page, which is a page common to all of the plurality of albums, based on an evaluation that is based on the first factor, generating common page data corresponding to the common page based on the at least one piece of image data selected as the common image data, automatically selecting at least one piece of image data out of the plurality of pieces of image data as individual image data corresponding to an image to be placed in an individual page, which is a page not common to all of the plurality of albums, based on an evaluation that is based on the second factor, generating a plurality of pieces of individual page data corresponding to the individual page based on the at least one piece of image data selected as the individual image data, and generating the plurality of pieces of album data based on the common page data and the plurality of pieces of individual page data, wherein the individual page data corresponding to first album data out of the plurality of pieces of album data and the individual page data corresponding to second album data out of the plurality of pieces of album data are different from each other, and wherein the common page data corresponding to the first album data out of the plurality of pieces of album data and the common page data corresponding to the second album data out of the plurality of pieces of album data are identical to each other.

Further features of the present disclosure will become apparent from the following description of exemplary embodiments with reference to the attached drawings.

BRIEF DESCRIPTION OF THE DRAWINGS

FIG. 6 is a diagram used to explain classification of scenes.

FIG. 9 is a diagram used to explain layouts of image data.

FIG. 10 is a flowchart illustrating spread joining processing which is performed by the album creation application.

FIGS. 13A, 13B, 13C, and 13D are flowcharts illustrating automatic layout processing which is performed by the album creation application.

DESCRIPTION OF THE EMBODIMENTS

Various exemplary embodiments, features, and aspects of the disclosure will be described in detail below with reference to the drawings.

In the following exemplary embodiments, procedures for activating an application program for creation of an album (hereinafter referred to as an "album creation application") and performing automatic layout processing to generate a layout image are described. The term "image" as used in the following description includes, unless otherwise stated, a still image, a moving image, and a frame image included in a moving image, and further includes a still image, a moving image, and a frame image included in a moving image which are present on a social networking service (SNS) server.

Figure 1:
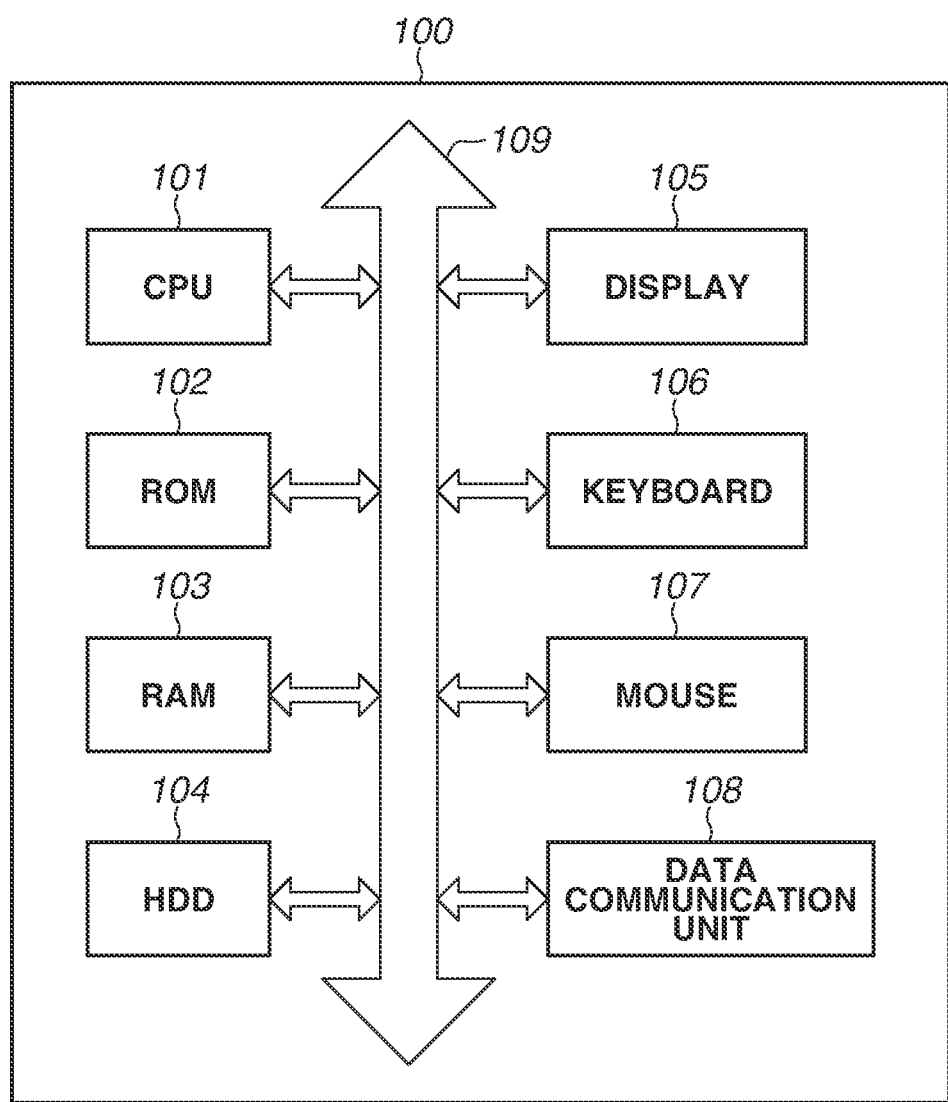
FIG. 1 is a block diagram illustrating a hardware configuration of an image processing apparatus.

FIG. 1 is a block diagram illustrating a hardware configuration of an image processing apparatus according to a first exemplary embodiment of the present disclosure. Examples of the image processing apparatus include a personal computer (PC), a smartphone, a tablet terminal, a camera, and a printer, and, in the first exemplary embodiment, the image processing apparatus is assumed to be a PC.

Referring to FIG. 1, the image processing apparatus 100 includes a central processing unit (CPU) 101, a read-only memory (ROM) 102, a random access memory (RAM) 103, a hard disk drive (HDD) 104, a display 105, a keyboard 106, a mouse 107, and a data communication unit 108. These elements are mutually interconnected via a data bus 109. A computer of the image processing apparatus 100 is configured with, for example, the CPU 101, ROM 102, and the RAM 103.

The CPU 101, which is a central arithmetic device or a processor, is a system control unit that controls the entire image processing apparatus 100. Moreover, the CPU 101 performs an image processing method described in the first exemplary embodiment according to a program. Furthermore, while, in FIG. 1, only one CPU is illustrated, the CPU 101 is not limited to this, but can include a plurality of CPUs.

Programs and an operating system (OS) which are executed by the CPU 101 are stored in the ROM 102. The RAM 103 provides a memory for temporarily storing various pieces of information to be used when programs are executed by the CPU 101. The HDD 104 is a storage medium for storing, for example, a database which retains image files and results of processing, such as image analysis. In the first exemplary embodiment, the RAM 103 stores an album creation application, details of which are described below.

The display 105 (display unit) is a device which displays a user interface (UI) in the first exemplary embodiment or a layout result of images to the user. The display 105 can be equipped with a touch sensor function. The keyboard 106 is one of input devices, and is used, for example, to input predetermined information onto a UI displayed on the display 105. The predetermined information is, for example, information indicating the number of spreads or the number of pages of an album intended to be created. The mouse 107 is one of input devices, and is used, for example, to click a button on the UI displayed on the display 105. Furthermore, the album creation application is activated, for example, by the user operating the mouse 107 to double-click an icon corresponding to the album creation application, which is displayed on the display 105.

The data communication unit 108 (communication unit) is a device provided to communicate with an external apparatus, such as a printer or a server. For example, data generated by the album creation application is transmitted via the data communication unit 108 to a printer (not illustrated) or a server (not illustrated) connected to the image processing apparatus 100. Moreover, the data communication unit 108 receives still image data present on a server (not illustrated) or a social networking service (SNS) server (not illustrated). Furthermore, while, in the first exemplary embodiment, the data communication unit 108 receives still image data from an SNS server, but the data communication unit 108 can also receive moving image data.

The data bus 109 connects the above-mentioned units (102 to 108) to the CPU 101.

In the first exemplary embodiment, the album creation application is configured to have the function of generating, at once, a plurality of pieces of album data including a common page and an individual page. The common page refers to a page which is included in common in all of the pieces of album data generated at once by the album creation application. The individual page refers to a page which is included in any one of the pieces of album data generated at once by the album creation application and which is not included in common in all of the pieces of album data generated at once by the album creation application. Since individual pages indicate contents corresponding to respective pieces of album data, the contents of individual pages differ for respective pieces of album data. Then, in the first exemplary embodiment, a factor (criterion) for selecting image data included in a common page and a factor for selecting image data included in an individual page are different from each other. Then, a factor for selecting image data included in an individual page differs for each piece of album data.

For example, suppose that there is a use case where a plurality of users brings respective pieces of image data to generate album data. In this case, it is requested that a plurality of pieces of album data which is output to respective ones of a plurality of users includes a common page, which is a page common to the plurality of pieces of album data, and an individual page, which is a page not common to the plurality of pieces of album data and different for each album. The method for generating album data including both a common page and an individual page includes, for example, a method in which, after album data configured with only common pages is generated, the user manually edits the album data. However, this method is troublesome for the user and is, therefore, low in usability. As in the first exemplary embodiment, selecting image data included in a common page and image data included in an individual page according to respective different criteria to generate a plurality of pieces of album data enables easily generating album data with an appropriate content.

When the album creation application in the first exemplary embodiment is installed in the image processing apparatus 100, a start-up icon is generated on the top screen (desktop), which is displayed on the display 105, by the OS running on the image processing apparatus 100. Then, when the user double-clicks the start-up icon with an operation of the mouse 107, a program of the album creation application stored in the HDD 104 is loaded onto the RAM 103. Then, the program loaded on the RAM 103 is executed by the CPU 101, so that the album creation application is activated.

Figure 3:
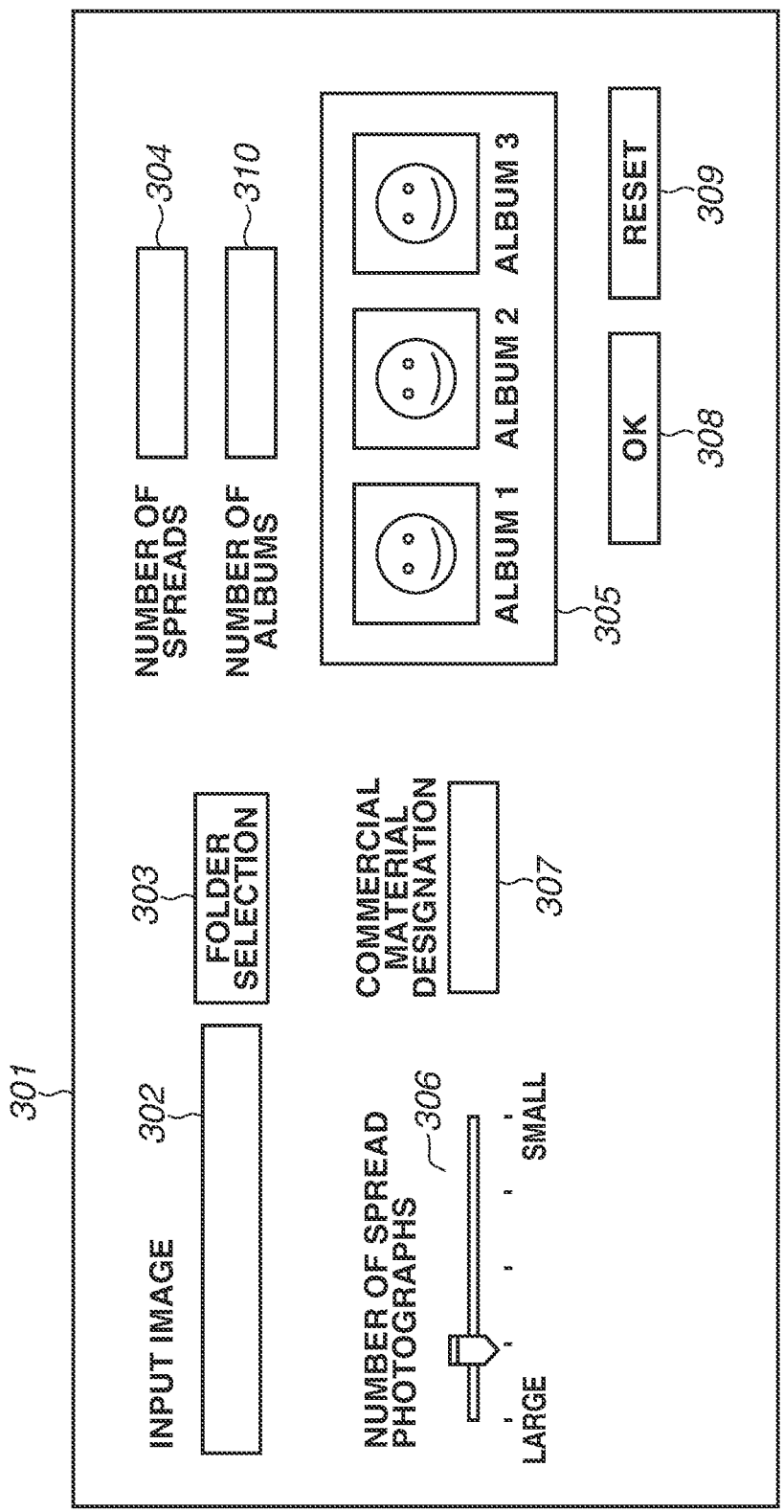
FIG. 3 is a diagram illustrating a setting screen which is displayed by the album creation application.

FIG. 3 is a diagram illustrating an example of a setting screen 301 which the album creation application as activated provides. The setting screen 301 is displayed on the display 105. In response to the user setting a creation condition for albums via the setting screen 301, the album creation application acquires the setting contents designated by the user.

In the first exemplary embodiment, an image data group for use in albums, the total number of pieces of spread data, a commercial material which is used for creation of an album, the number of pieces of album data which are created at once, and a main subject for each album are able to be set as the creation condition for albums. Furthermore, in the first exemplary embodiment, pages include a spread page (hereinafter referred to as a "spread") and an individual page. Then, in the first exemplary embodiment, a spread is equivalent to a pair of individual pages adjacent to each other printed on different sheets, and spread data is data which is used to determine a layout of a spread and print the spread with the determined layout. Furthermore, while, in the first exemplary embodiment, a configuration in which processing is performed for each piece of spread data is employed, a configuration in which processing is performed for each piece of page data corresponding to one page (one individual page) can be employed. Moreover, the main subject refers to a subject which is preferentially laid out in an album. For example, a particular individual or a category or object of a thing, such as a dog, cat, flower, or food, is able to be set as the main subject.

A path box 302 on the setting screen 301 represents a storage location (path) in the HDD 104 for an image data group targeted for album creation. When a folder selection button 303 is clicked by the mouse 107 being operated by the user, a folder including an image data group targeted for album creation is displayed in a tree structure in such a manner as to be able to be selected by the user. Then, a folder path including an image data group selected by the user is displayed in the path box 302. The image data group designated here is acquired, so that album data is generated. Furthermore, an image data group can be acquired from a storage region, such as a server on a network or an SNS server, via the data communication unit 108. The image data group as used herein represents candidates for image data for use in album creation. Moreover, in designating an image data group targeted for album creation, information other than a storage location for the image data group targeted for album creation can be input. For example, the date and time at which an image data group targeted for album creation was generated (photographs corresponding to the image data group were taken) (hereinafter referred to as an "image capturing date and time") can be designated.

Image data targeted for album creation is, for example, still image data or clipped image data obtained by clipping a frame from moving image data. Still image data or clipped image data is data acquired from an imaging device. The imaging device can be included in the image processing apparatus 100 or can be included in an external apparatus (for example, a PC, a smartphone, a digital camera, or a tablet terminal) which is an apparatus external to the image processing apparatus 100. Furthermore, when acquiring image data from an external apparatus, the image processing apparatus 100 acquires the image data via the data communication unit 108. Moreover, the image processing apparatus 100 can acquire still image data or clipped image data from a network or a server via the data communication unit 108. The CPU 101 analyzes data appended to image data and determines from where each piece of image data was acquired. Furthermore, when acquiring image data from an SNS server via the album creation application, the CPU 101 can use the album creation application to manage from where the image data was acquired. Furthermore, image data which is used by the album creation application is not limited to the above-mentioned type of image data, but can be another type of image data.

A number of spreads box 304 is a box used to receive, from the user, designation of the total number of spreads in one album. The user is allowed to designate the total number of spreads by, for example, directly entering numerals in the number of spreads box 304 with use of the keyboard 106 or entering numerals in the number of spreads box 304 from a list with use of the mouse 107. Furthermore, while the number of spreads designated here is applied to all of the albums corresponding to the number designated in a number of albums box 310, for example, a configuration in which the total number of spreads is designated for each album can be employed.

The number of albums box 310 is a box used to receive, from the user, designation of the number of albums which are to be created at once by the album creation application. The user is allowed to designate the number of albums which are to be created by the album creation application by, for example, directly entering numerals in the number of albums box 310 with use of the keyboard 106 or entering numerals in the number of albums box 310 from a list with use of the mouse 107.

Figure 2:
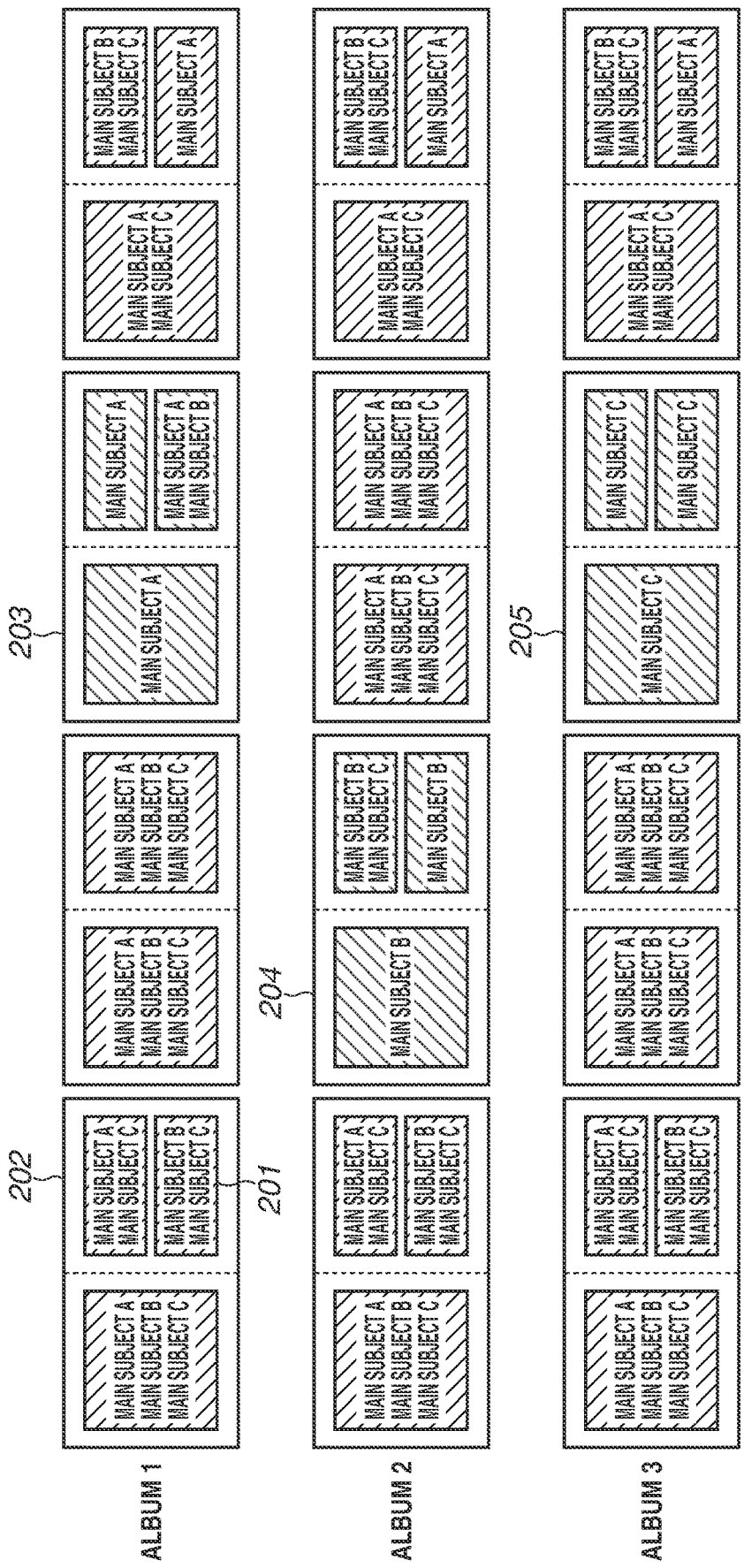
FIG. 2 is a diagram illustrating examples of spreads included in albums which are created by an album creation application.

Examples of spreads included in albums which are generated by the album creation application are described with reference to FIG. 2. As mentioned above, in the first exemplary embodiment, since a common page and an individual page are included in each of albums the number of which is designated via the number of albums box 310, respective albums differ from each other in the content of at least a part thereof.

Here, suppose that three albums (albums 1 to 3) are created at a time with the number of albums designated at the number of albums box 310. An image 201 is an example of an image arranged in a spread of the album 1, and letters in the image 201 represent main subjects shown in the image 201. A spread 202 is a spread composed of a common page and is included in all of the albums 1 to 3. Then, in this way, the common page is included in all of the albums and is, therefore, laid out with a focus on an image in which the main subjects designated in the respective albums are shown. On the other hand, each of spreads 203, 204, and 205 is a spread composed of an individual page. Therefore, each of spreads 203, 204, and 205 is included in only one album. Then, for example, the spread 203, which is included in the album 1, is laid out with a focus on an image in which a main subject A, which is a main subject designated in the album 1, is shown. Moreover, the spread 204, which is included in the album 2, is laid out with a focus on an image in which a main subject B, which is a main subject designated in the album 2, is shown. In this way, in the first exemplary embodiment, a plurality of albums each of which is composed of two types of spreads created according to respective different criteria is created.

A main subject designation portion 305 is a region used to receive, from the user, designation of a main subject with respect to each of the albums corresponding to the number entered in the number of albums box 310. For example, the user is able to designate, with the mouse 107, a main subject for every album by dragging and dropping image data in which a main subject is shown to a region corresponding to each album included in the main subject designation portion 305.

A number of spread photographs portion 306 is a region used to receive, from the user, designation of the largeness or smallness of the number of pieces of image data which are arranged in each spread of an album to be created. The user is able to increase the number of pieces of image data which are arranged in each spread, by setting a slider bar to the "large" side. Furthermore, as the number of pieces of image data which are arranged in each spread is increased, the number of pieces of image data which are arranged in each album is increased accordingly. Moreover, the user is able to decrease the number of pieces of image data which are arranged in each spread, by setting the slider bar to the "small" side. Furthermore, as the number of pieces of image data which are arranged in each spread is decreased, the number of pieces of image data which are arranged in each album is decreased accordingly. Furthermore, while the largeness or smallness of the number of pieces of image data designated here is applied to all of the albums corresponding to the number designated in the number of albums box 310, for example, a configuration in which the largeness or smallness of the number of pieces of image data is designated for each album can be employed.

A commercial material designation portion 307 is a region used to receive, from the user, designation of a commercial material for use in an album to be created. The user is able to perform entry in the commercial material designation portion 307 to set, for example, the size of an album, the type of paper for the album, the type of a cover sheet of the album, and the type of a biding portion of the album.

An OK button 308 is a button used to receive, from the user, an input indicating that the setting for an album to be created is completed. When the OK button 308 is clicked by the user via the mouse 107, the album creation application acquires the contents which have been set on the setting screen 301, and then uses the acquired contents for album data creation processing described below.

A reset button 309 is a button used to reset the respective pieces of setting information on the setting screen 301.

Furthermore, the setting screen 301 can be configured to allow settings other than the above-mentioned settings to be performed. For example, the setting screen 301 can be configured to allow, for example, setting concerning a moving image and setting of the acquisition destination of still or moving image data, or can be configured to allow the mode of an album targeted for creation to be designated. Furthermore, the mode of an album is a mode according to which to preferentially lay out an image containing a predetermined object in a template, and includes, for example, three modes of "person", "animal", and "food". Furthermore, the mode of an album can be reworded as, for example, the theme of an album. For example, in a case where the mode "person" is selected, an image containing a person is preferentially laid out in the template. Moreover, in a case where the mode "animal" is selected, an image containing an animal is preferentially laid out in the template. Moreover, in a case where the mode "food" is selected, an image containing food is preferentially laid out in the template. Furthermore, there can be a mode for preferentially laying out image data representing an image containing an object other than the above-mentioned three objects in the template. Moreover, a plurality of modes can be concurrently selected. In that case, an image containing at least one of a plurality of objects corresponding to the selected plurality of modes is preferentially laid out in the template. The user is allowed to select any one icon of the plurality of icons corresponding to the respective modes by clicking with the mouse 107. Then, a mode corresponding to the selected icon is set as the mode of an album to be created. Furthermore, the modes of albums are not limited to the above-mentioned three modes, but can additionally include other modes, such as "building", "vehicle", and "flower".

Figure 4A:
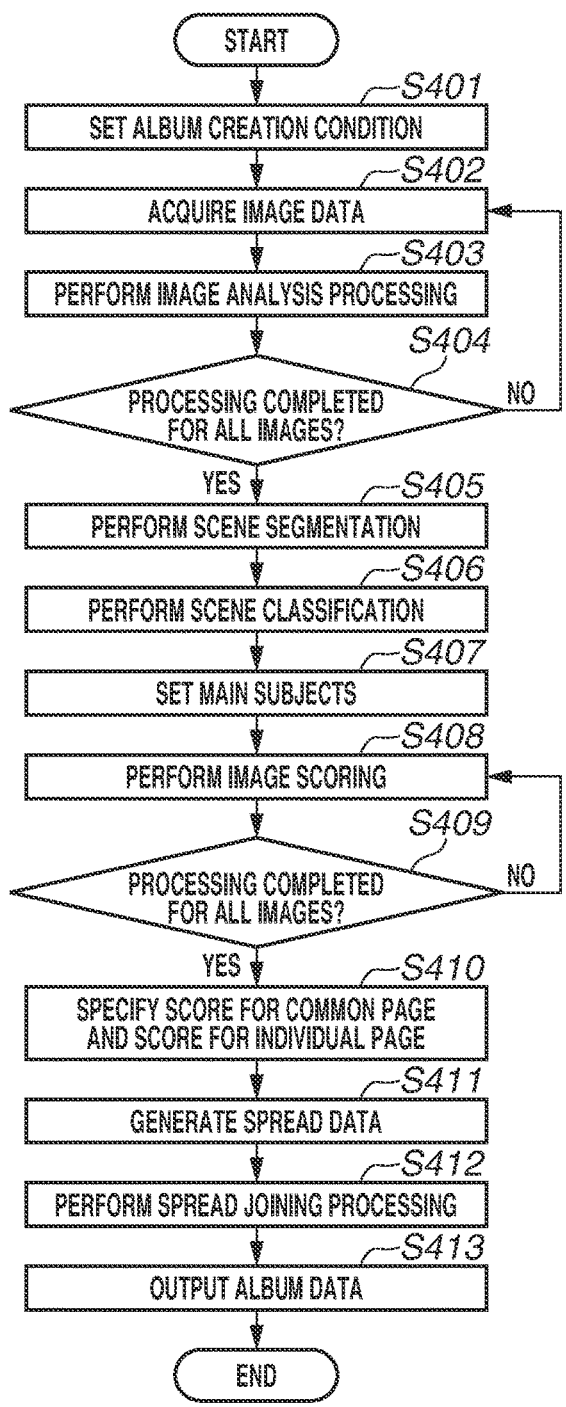
FIGS. 4A, 4B, and 4C are flowcharts illustrating automatic layout processing which is performed by the album creation application.
Figure 4B:
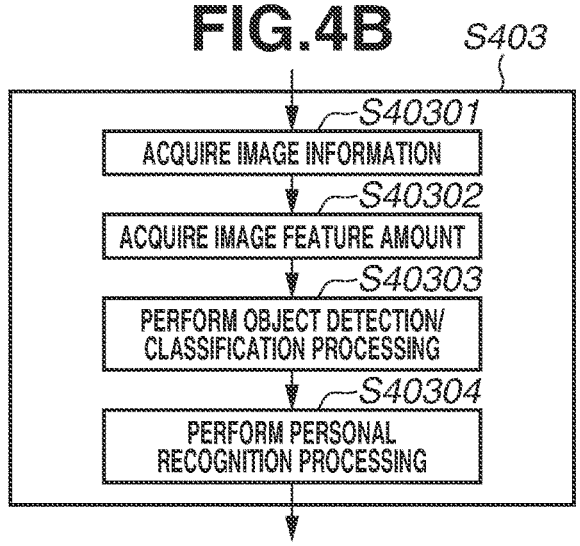
Figure 4C:
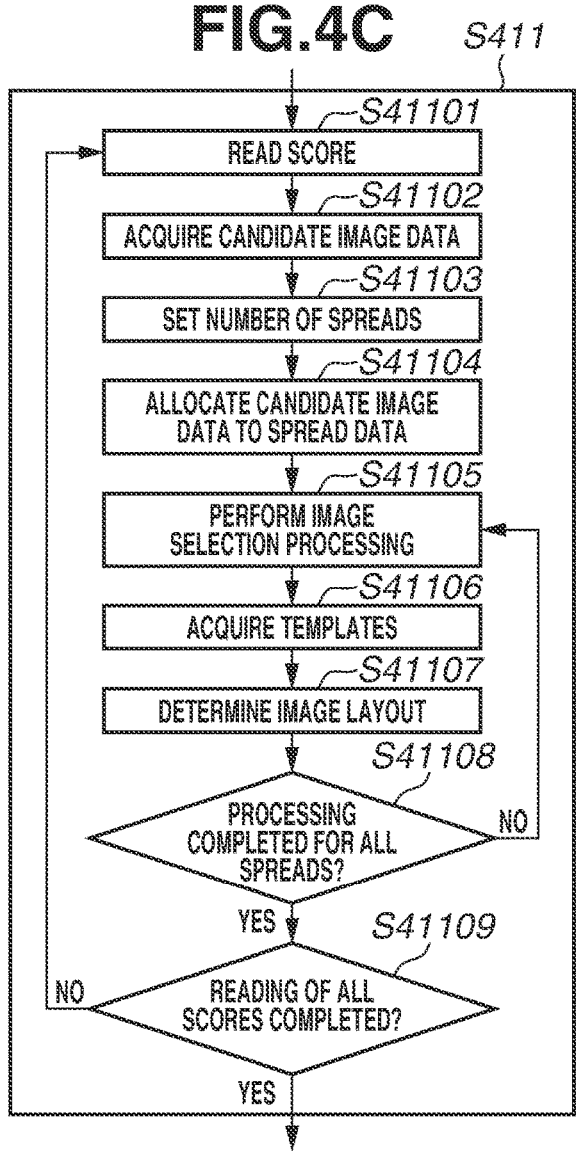

FIGS. 4A, 4B, and 4C are flowcharts illustrating automatic layout processing which is performed by the album creation application according to the first exemplary embodiment. The flowcharts illustrated in FIGS. 4A to 4C are implemented, for example, by the CPU 101 loading a program corresponding to the album creation application stored in the HDD 104 onto the ROM 102 or the RAM 103 and executing the program. Furthermore, in the first exemplary embodiment, the album creation application, which is stored in the HDD 104, is activated by an icon corresponding to the album creation application displayed on the display 105 being operated by the user with the mouse 107, and then performs the following processing.

First, in step S401, the CPU 101 sets an album creation condition. Specifically, for example, the CPU 101 receives setting of the album creation condition from the user via the screen illustrated in FIG. 3. Details of the setting of the album creation condition are as described above with reference to FIG. 3.

In step S402, the CPU 101 acquires image data included in an image data group designated in the path box 302. Specifically, the CPU 101 reads an image data group designated in the path box 302 from the HDD 104 and then loads image data included in the image data group onto the RAM 103.

In step S403, the CPU 101 performs image analysis processing for analyzing image data loaded onto the RAM 103 in step S402. FIG. 4B is a flowchart illustrating image analysis processing which is performed by the album creation application according to the first exemplary embodiment.

In step S40301, the CPU 101 acquires information about the image capturing date and time from information (for example, Exif information) accompanying the image data acquired in step S402.

In step S40302, the CPU 101 acquires information about a feature amount of image data from the image data acquired in step S402. Examples of the feature amount include focus. Examples of the method for detecting an edge to acquire the feature amount concerning focus include using a commonly-used Sobel filter. The gradient of an edge, in other words, luminance gradient, can be calculated by detecting the edge via the Sobel filter and dividing a luminance difference between the starting point and end point of the edge by a distance between the starting point and end point thereof. The result obtained by calculating an average gradient of edges in the image enables deeming an image with a large average gradient to be more in focus than an image with a small average gradient. Then, setting a plurality of threshold values different from each other with respect to the gradient enables outputting an evaluation value of the amount of focusing by determining which threshold value the gradient is equal to or greater than. In the first exemplary embodiment, two different threshold values are previously set, and the amount of focusing is determined in three levels of "o", "Δ", and "x". The threshold values are previously set, for example, through experiment in such a manner that the gradient of focus desired to be employed for an album is set to level "o", the allowable gradient of focus is set to level "Δ", and the unallowable gradient of focus is set to level "x". Furthermore, for example, the setting of threshold values can be provided by, for example, a creator of the album creation application, or can be configured to be able to be performed on a user interface.

In step S40303, the CPU 101 performs object detection processing on each piece of image data acquired in step S402. First, the CPU 101 detects the face of a person from an image represented by each piece of image data acquired in step S402. A known method can be used for processing for face detection, and, for example, AdaBoost, in which a strong classifier is generated from a plurality of previously-prepared weak classifiers, is used. In the first exemplary embodiment, the face image of a person (object) is detected by a strong classifier generated according to AdaBoost. Moreover, the CPU 101 not only extracts the face image but also acquires the upper left coordinate values and lower right coordinate values of the position of the detected face image. Acquiring such two types of coordinates enables the CPU 101 to acquire the position of the face image and the size of the face image. Moreover, in step S40303, the CPU 101 can generate a strong classifier according to AdaBoost with not only a face but also another object, such as an animal, for example, a dog or cat, a flower, food, a building, a stationary article, or a vehicle, used as a detection target. This also enables the CPU 101 to detect objects other than faces.

Moreover, the CPU 101 can search for an object with use of not AdaBoost but, for example, a deep neural network.

In step S40304, the CPU 101 performs personal recognition processing. Specifically, the CPU 101 performs personal recognition by making a comparison in similarity between the face image extracted in step S40303 and a representative face image stored for each personal ID in a face dictionary database. The CPU 101 determines the similarity between the face image extracted in step S40303 and each representative face image, and sets the ID of a representative face image with the similarity equal to or greater than a threshold value and with the highest similarity as the ID of the face image extracted in step S40303. In other words, the CPU 101 identifies a person corresponding to the representative face image with the similarity equal to or greater than a threshold value and with the highest similarity as a person corresponding to the face image extracted in step S40303. Furthermore, in a case where the similarity between the face image extracted in step S40303 and every representative face image stored in the face dictionary database is less than the threshold value, the CPU 101 assigns a new personal ID to the extracted face image and registers the extracted face image as a new person with the face dictionary database. Furthermore, the face dictionary database is stored in, for example, the HDD 104.

In step S404, the CPU 101 determines whether the image analysis processing has been completed with respect to all of the pieces of image data stored in the image data group designated in the path box 302. If it is determined that the image analysis processing has not yet been completed (NO in step S404), the CPU 101 returns the processing to step S402, in which the CPU 101 acquires image data that is not yet subjected to the image analysis processing. If it is determined that the image analysis processing has been completed (YES in step S404), the CPU 101 advances the processing to step S405.

Figure 5A:
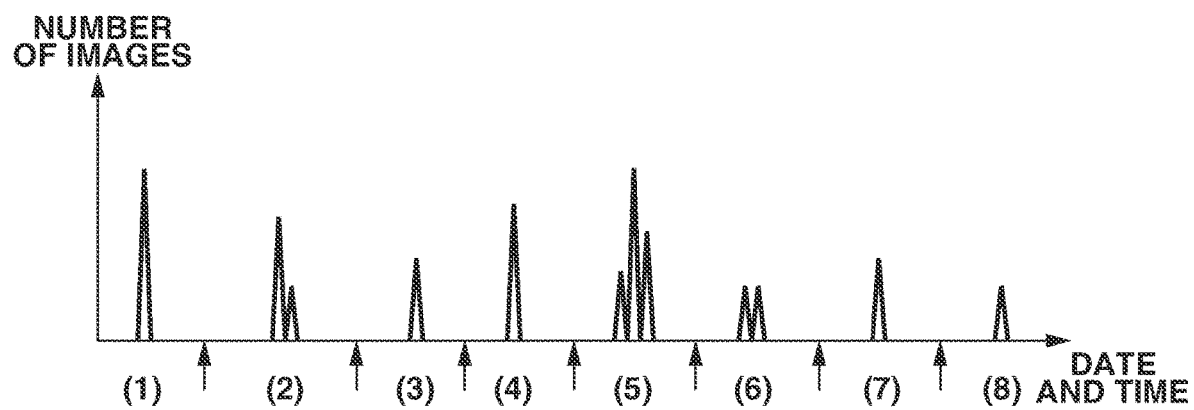
FIGS. 5A, 5B, and 5C are diagrams used to explain segmentation of an image data group.
Figure 5B:
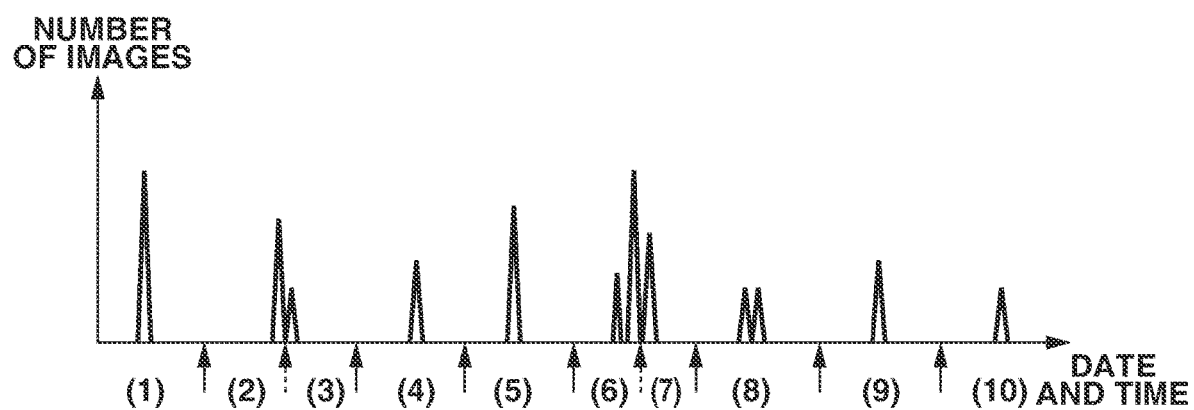
Figure 5C:
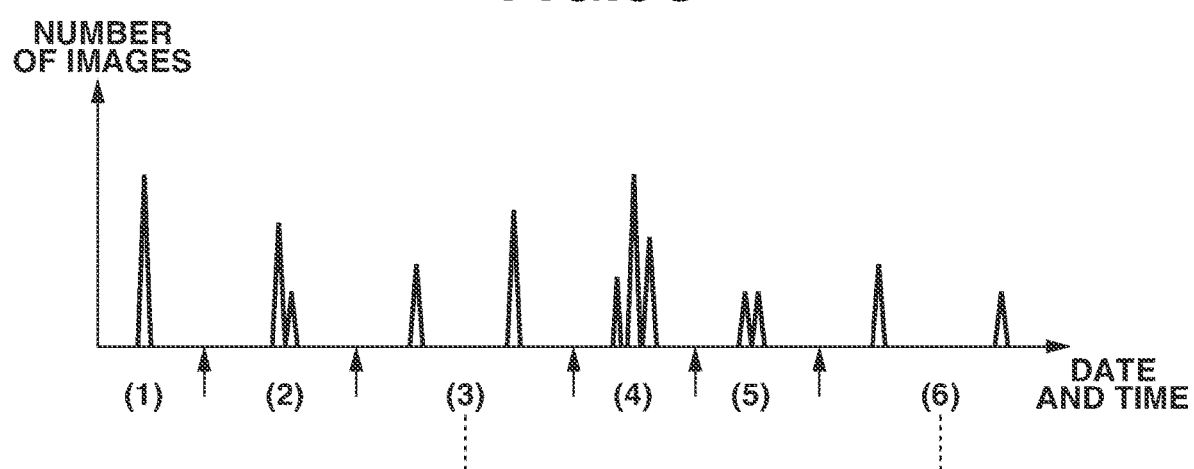

In step S405, the CPU 101 performs scene segmentation. The scene segmentation refers to segmenting all of the pieces of image data acquired in steps S401 to S404 by scenes and managing the segmented pieces of image data as a plurality of image groups. More specifically, the CPU 101 segments all of the pieces of image data into a plurality of image groups based on time differences in image capturing date and time of respective pieces of image data calculated from the image capturing date and time information acquired in step S403. Furthermore, in the following description, each image group obtained by segmenting all of the pieces of image data (main image group) is referred to as a "sub-image group". In the first exemplary embodiment, for example, the CPU 101 performs scene segmentation according to the following method. First, if the difference between the image capturing date and time of the N-th captured image data and the image capturing date and time of the (N+1)-th captured image data in ascending order of the image capturing date and time is equal to or less than one day, the CPU 101 performs the following operation. If the difference between the image capturing date and time of the N-th captured image data and the image capturing date and time of the (N+1)-th captured image data in ascending order of the image capturing date and time is equal to or greater than sixteen hours, the CPU 101 sets a boundary of groups between the N-th captured image data and the (N+1)-th captured image data. Moreover, there may be a case where the difference in image capturing date and time between pieces of captured image data adjacent in ascending order of the image capturing date and time is less than sixteen hours between every piece of captured image data. In this case, if the difference between the image capturing date and time of the first captured image data and the image capturing date and time of the last captured image data in a captured image data group captured in one day is less than four hours, the CPU 101 sets the captured image data group captured in that day as one sub-image group. On the other hand, there may be a case where the difference between the image capturing date and time of the first captured image data and the image capturing date and time of the last captured image data in the captured image data group captured in that day is equal to or greater than four hours. In this case, if the number of pieces of captured image data captured in that day is less than 50 (the number of captured images captured in one day is less than 50), the CPU 101 sets the captured image data group captured in that day as one sub-image group. FIG. 5A illustrates an example of such grouping of pieces of captured image data. In FIGS. 5A to 5C, the horizontal axis indicates image capturing date and time (the more left side being old and the more right side being new), and the vertical axis indicates the number of pieces of captured image data. Referring to FIG. 5A, the captured image data group is segmented into eight sub-image groups, including groups 601 to 608. In FIG. 5A, each arrow indicates a boundary of groups. Furthermore, the threshold value regarding the difference in image capturing date and time and the threshold value regarding the number of pieces of captured image data used in the above description of the scene segmentation method are merely examples, and are not limited to the above-mentioned values. Furthermore, an image group obtained by segmentation is referred to as a "segmented image group", and one segmented image group is set with respect to every scene.

Moreover, while, in the first exemplary embodiment, image capturing date and time information is used for scene segmentation, the first exemplary embodiment is not limited to this. For example, using image capturing position information, the CPU 101 can set two pieces of image data close in image capturing position as one segmented image group. Moreover, for example, the CPU 101 can use a personal recognition result. For example, the CPU 101 previously registers pieces of image data about students belonging to a given group (for example, a class or a club) with an album creation application. Then, the CPU 101 can use personal recognition results obtained by recognition with the registered pieces of image data to set two pieces of image data in which the students belonging to the group are shown as one segmented image group. Moreover, for example, the CPU 101 can use tag information appended with, for example, the name of a folder in which images are stored or with a social networking service. Specifically, for example, the CPU 101 can set two pieces of image data having tag information including a search word, such as "a school athletic meet" or "school trip". The search word is, for example, input from the user via the setting screen 301.

In step S406, the CPU 101 performs scene classification. Specifically, the CPU 101 performs scoring on the sub-image groups obtained by performing scene segmentation in step S407 by every type of scene, and classifies the sub-image groups into the respective types of scenes with the highest score. Furthermore, in the following description, the scoring operation in step S406 is referred to as "scene classification scoring". In the first exemplary embodiment, the types of scenes are assumed to include "travel", "daily life", and "ceremony", and an example in which each sub-image group is classified into any one of these scenes is described. Furthermore, scene classification scoring is performed with use of a scene classification table in which information about feature amounts corresponding to the respective types of scenes is stored.

Here, a method for generating the scene classification table, which is previously stored in a program, is described. First, a plurality of image data groups previously determined to be classified into the respective scenes of "travel", "daily life", and "ceremony" is collected by the designer of the program, and feature amounts are acquired with respect to the collected image data groups. Examples of the feature amounts acquired in this instance include an image capturing period, the number of captured images, and the number of persons subjected to image capturing. The image capturing period is an image capturing time difference between the first generated image data and the last generated image data in each image data group. The number of captured images is the number of images in each image data group. The number of persons subjected to image capturing is the average number of faces contained in each image represented by each image data group. As a result, for example, with respect to one image data group including a plurality of pieces of image data previously determined to be a travel scene, the feature amounts, which include an image capturing period, the number of captured images, and the number of persons subjected to image capturing, are acquired. Furthermore, the feature amounts are not limited to an image capturing period, the number of captured images, and the number of persons subjected to image capturing, and other feature amounts can also be used or only any one of these feature amounts can also be used.

Then, the acquisition of feature amounts, such as the above-mentioned image capturing period, the number of captured images, and the number of persons subjected to image capturing, is also performed with respect to previously-collected other image data groups. Next, an average value and a standard deviation of the image capturing period, an average value and a standard deviation of the number of captured images, and an average value and a standard deviation of the number of persons subjected to image capturing per one image are obtained based on the feature amounts acquired from a plurality of image data groups collected for each scene. The values obtained in this way and the respective types of scenes are associated with each other, so that a scene classification table which indicates the average value and standard deviation for each type of scene is generated.

In the first exemplary embodiment, a table 600 illustrated in FIG. 6 is assumed to be used as the scene classification table. In the table 600, an average value and a standard deviation of each of an image capturing period 602, the number of captured images 603, and the number of persons subjected to image capturing 604 are previously registered in association with a scene ID 601. The CPU 101 previously stores the table 600 in a storage region, such as the ROM 102 or the HDD 104, prior to scene classification processing. Furthermore, the table 600 can be previously incorporated in the program of the album creation application, or can be previously incorporated in a program outside the album creation application.

Here, the scene classification scoring is described. After the album creation application is activated, the CPU 101 calculates the scores of the respective feature amounts of the image capturing period, the number of captured images, and the number of persons subjected to image capturing with respect to each of the sub-image groups obtained by scene-segmenting, in step S405, the image data group designated by the user via the path box 302. The CPU 101 calculates the scores and their average scores of the image capturing period, the number of captured images, and the number of persons subjected to image capturing with respect to each sub-image group using the average value and standard deviation for each scene illustrated in FIG. 6 according to the following formulae (1) and (2). Furthermore, the average value of a predetermined feature amount corresponding to a predetermined type of scene and the standard deviation of the predetermined feature amount corresponding to the predetermined type of scene in the following formulae are registered with the table 600. Moreover, the feature amounts are acquired with respect to three feature items, i.e., the image capturing period, the number of captured images, and the number of persons subjected to image capturing. Therefore, the number of feature items in this example is three.

First, the CPU 101 calculates the scores of the sub-image groups for the respective types of scenes and the respective feature amounts according to formula (1).

The score of a predetermined feature amount corresponding to a predetermined type of scene in a sub-image group=50−|10×(the average value of the predetermined feature amount corresponding to the predetermined type of scene−the predetermined feature amount in the sub-image group)/the standard deviation of the predetermined feature amount corresponding to the predetermined type of scene)    (1)

With this, for example, in a sub-image group, the respective scores of the image capturing period, the number of captured images, and the number of persons subjected to image capturing corresponding to the "travel" scene are acquired. Furthermore, the CPU 101 acquires the scores with respect to not only the "travel" scene but also the other types of scenes.

Next, the CPU 101 averages, according to formula (2), the respective scores obtained according to formula (1), thus acquiring the score concerning each type of scene in the sub-image group.

The score concerning a predetermined type of scene in a sub-image group=(the score of the image capturing period+the score of the number of captured images+the score of the number of persons subjected to image capturing corresponding to the predetermined type of scene in the sub-image group)/the number of feature items    (2)

With this, for example, in a sub-image group, the scores concerning the respective types of scenes of "travel", "daily life", and "ceremony" are acquired. Furthermore, the CPU 101 performs the scene classification scoring with respect to every sub-image group.

In the above-described way, the respective scores for "travel", "daily life", and "ceremony" are acquired with respect to each sub-image group. Then, the CPU 101 classifies a scene with the score ranking first as the scene of the corresponding sub-image group. For example, a sub-image group 5 corresponding to a scene 5 obtained by scene segmentation illustrated in FIG. 5A is assumed to have the image capturing period being 36 hours, the number of captured images being 300, and the number of persons subjected to image capturing being 1.7. Then, in the sub-image group 5, the score concerning "travel" becomes 45.32, the score concerning "daily life" becomes 18.38, and the score concerning "ceremony" becomes −29.92, so that the sub-image group 5 is classified as "travel", which is a scene with the highest score. Furthermore, which sub-image group is classified as which scene is managed with a scene ID in a discriminable manner. Moreover, in a case where there are the same scores among scores concerning the respective scenes, the CPU 101 classifies a sub-image group as any one of the scenes with the same score according to predetermined ordering of preference. Specifically, the CPU 101 classifies a sub-image group as a scene which is higher in preference among the scenes with the same score. Furthermore, for example, in the first exemplary embodiment, the ordering of preference is assumed to be the order of "daily life">"ceremony">"travel". The ordering of preference is not limited to this order, but, for example, the ordering of preference can be configured to be settable by the user.

Furthermore, while the feature amounts for use in scene classification scoring are acquired with respect to three feature items, i.e., the image capturing period, the number of captured images, and the number of persons subjected to image capturing, the first exemplary embodiment is not limited to this. For example, a flag indicating whether a predetermined object corresponding to each scene is included in image data can be set as a feature amount. For example, in a case where a predetermined object corresponding to "travel" is "sky", the score concerning "travel" is set in such a manner as to become high with respect to a sub-image group in which the number of pieces of image data including "sky" is large. Moreover, personal identification information can be set as a feature amount. For example, suppose that there are scenes of "wedding ceremony" and "wedding reception", into which a scene of "ceremony" is further finely classified. Then, the CPU 101 identifies, as the bride and groom, two persons who are most frequently included in pieces of image data in a main image group. Then, a flag indicating whether only the bride and groom are included or whether any person other than the bride and groom is included is set as a feature amount. In this case, for example, the score concerning "wedding ceremony" is set in such a manner as to become high with respect to a sub-image group in which the number of pieces of image data including only the bride and groom is large, and the score concerning "wedding reception" is set in such a manner as to become high with respect to a sub-image group in which the number of pieces of image data including any person other than the bride and groom is large. Furthermore, scene classification can be performed with, for example, outputting obtained by machine learning using a convolutional neural network (CNN).

In step S407, the CPU 101 sets a main subject with respect to the respective albums corresponding to the number entered in the number of albums box 310 according to an input from the user to the main subject designation portion 305. Here, for the purpose of illustration, suppose that a main subject 1 is set for the album 1 and a main subject 2 is set for the album 2.

In step S408, the CPU 101 performs image scoring. The image scoring in step S408 refers to assigning a score (scoring) evaluated from a viewpoint described below for each piece of image data, and is referred to at the time of selecting image data representing an image to be placed in a template as described below. In the first exemplary embodiment, image scoring is performed in a plurality of viewpoints based on the feature amount of each piece of image data acquired in step S40302. In other words, in the first exemplary embodiment, a plurality of scores is assigned to each piece of image data by image scoring. Specifically, in the first exemplary embodiment, scores in three viewpoints, i.e., a score that is based on image quality, a score that is based on the main subject 1, and a score that is based on the main subject 2, are assigned to each piece of image data.

First, image scoring that is based on image quality is described. In the first exemplary embodiment, for example, in image scoring that is based on image quality, a feature amount of, for example, focus or the number of pixels is used. Specifically, for example, a score that is based on image quality is assigned in such a manner that a score assigned to image data in which the feature amount of focus acquired in step S40302 is at level "○" becomes higher than a score assigned to image data in which the feature amount of focus acquired therein is at level "Δ" or "x". Moreover, for example, a score that is based on image quality is assigned to each piece of image data in such a manner that a score assigned to image data representing an image having a large number of pixels becomes higher than a score assigned to image data representing an image having a small number of pixels. Furthermore, a feature amount for use in image scoring that is based on image quality can be image capturing information such as lens information used at the time of image capturing, or can be a compression format of images to be input to an application.

Next, image scoring that is based on the main subject 1 and image scoring that is based on the main subject 2 are described. These image scoring operations are performed based on information about whether a main subject, who is identified with use of the size of a face analyzed in step S40303 and personal recognition performed in step S40304, is included in in image data. For example, a score that is based on the main subject 1 is assigned to image data in such a manner that a score assigned to image data in which the main subject 1 is included becomes higher than a score assigned to image data in which the main subject 1 is not included. Moreover, for example, a score that is based on the main subject 1 is assigned to image data in such a manner that a score assigned to image data in which the area (size) occupied by the main subject 1 is large becomes higher than a score assigned to image data in which the area (size) occupied by the main subject 1 is small. Moreover, for example, a score that is based on the main subject 1 is assigned to image data in such a manner that a score assigned to image data in which a smiling subject 1 is included becomes higher than a score assigned to image data in which an unsmiling subject 1 is included. With regard to the subject 2, image scoring is also performed in the same viewpoint.

In step S409, the CPU 101 determines whether the image scoring has been completed with respect to all of the pieces of image data included in the image data group designated in the path box 302. If it is determined that the image scoring has not yet been completed (NO in step S409), the CPU 101 returns the processing to step S408, in which the CPU 101 performs image scoring on image data that is not yet subjected to the image scoring. If it is determined that the image scoring has been completed (YES in step S409), the CPU 101 advances the processing to step S410.

In step S410, the CPU 101 specifies a score for common page and a score for individual page with respect to all of the pieces of image data acquired in step S402 in the light of a result of image scoring performed in step S408. The common page is a page included in common in all of the albums designated to be created in the setting screen 301. On the other hand, the individual page is a page included in only one album out of the albums designated to be created in the setting screen 301. The score for individual page is specified for each of the albums designated to be created in the setting screen 301.

A score $^I score_s$ for common page of image data I is expressed by the following formula (3).

$$^I\text{score}_s = \Sigma_i w_i {^I\text{score}_i} \quad (3)$$

Here, $^I\text{score}_i$ denotes the i-th score out of the respective scores (a score that is based on image quality, a score that is based on the main subject 1, and a score that is based on the main subject 2) assigned to the image data I, and $w_i$ denotes a weight added to each score. In the first exemplary embodiment, the weight $w_i$ is set equal to ⅓, so that the score that is based on image quality, the score that is based on the main subject 1, and the score that is based on the main subject 2 are evenly evaluated. With this, the score for common page is specified in such a manner that the score of an image the image quality of which is good and in which the number of main subjects shown therein (or the size of each main subject shown therein) is large becomes high. Thus, the score for common page is specified in consideration of each main subject corresponding to each of all of the pieces of album data designated to be created.

A score $^I\text{score}_{IO}$ for individual page corresponding to album data O of the image data I is expressed by the following formula (4). Furthermore, O denotes an album number allocated to each of a plurality of pieces of album data designated by the user to be created. Thus, in the first exemplary embodiment, scores for individual page the number of which corresponds to the number of pieces of album data are assigned to the image data I.

$$^I\text{score}_{IO} = \begin{cases} 0 & (^I\text{score}_o = 0) \\ \dfrac{w_q \cdot {^I\text{score}_q} + w_o \cdot {^I\text{score}_o}}{2} & (\text{otherwise}) \end{cases} \quad (4)$$

Here, $^I\text{score}_q$ denotes a score that is based on image quality, assigned to the image data I, $^I\text{score}_o$ denotes a score that is based on a main subject $_sO$ corresponding to album data O, assigned to the image data I, $w_q$ denotes a weight added to a score that is based on image quality, and $w_o$ denotes a weight added to a score that is based on the main subject $_sO$. In the first exemplary embodiment, the weights $w_q$ and $w_o$ are set equal to 1, so that the score for individual page is specified in such a manner that the score of an image the image quality of which is good and in which the number of main subjects $_sO$ shown therein (or the size of each main subject $_sO$ shown therein) is large becomes high. In other words, the score for individual page is specified without consideration of main subjects other than the main subject $_sO$ (main subjects not corresponding to the album data O). Specifying a score for individual page is performed for each piece of album data. Thus, as a result, in step S410, scores for individual page the number of which corresponds to the number of pieces of album data designated to be created in the setting screen 301 are specified, and one score for common page is specified. Furthermore, in the first exemplary embodiment, in a case where the score $^I\text{score}_o$ is 0, the score $^I\text{score}_{IO}$ becomes 0 irrespective of the score $^I\text{score}_q$.

In this way, in the first exemplary embodiment, an evaluation for common page and an evaluation for individual page are performed based on the respective different factors. Specifically, an evaluation for common page is performed based on factors about a plurality of main subjects respectively corresponding to a plurality of pieces of album data. On the other hand, an evaluation for individual page corresponding to an album O is performed based on a factor about a main subject corresponding to the album O, and is not performed based on a factor about a main subject corresponding to another album. This enables appropriately performing an estimation for common page and an estimation for individual page.

Furthermore, while specifying a score for common page and specifying a score for individual page are performed based on the image quality and main subjects, the first exemplary embodiment is not limited to this. For example, with regard to image data in which no main subject is included (for example, image data classified into "landscape"), a score thereof can be specified based on another piece of image information associated with the image data. Moreover, for example, image data which is small in the difference in image capturing time from image data having a high score can be controlled to have a high score. This enables also assigning a high score to, for example, image data which is likely to have relevance to image data in which a main subject is included.

In step S411, the CPU 101 generates spread data representing a spread included in an album with use of the scores specified in step S410. FIG. 4C is a flowchart illustrating spread data generation processing which is performed by the album creation application according to the first exemplary embodiment.

In step S41101, the CPU 101 reads one score out of the scores specified in step S410 with respect to all of the pieces of image data acquired in step S402. In the first exemplary embodiment, suppose that the number of albums designated by the user to be created is two. Then, suppose that the CPU 101 reads a score of each piece of image data in the order of a score for individual page about the album 1, a score for individual page about the album 2, and a score for common page. However, the first exemplary embodiment is not limited to this, and the CPU 101 can read any score in first. Furthermore, in a case where a score for individual page is read in step S41101, in the subsequent processing, the CPU 101 generates spread data for individual page, and, in a case where a score for common page is read in step S41101, in the subsequent processing, the CPU 101 generates spread data for common page.

In step S41102, the CPU 101 acquires candidate image data, which serves as a candidate for image data to be arranged in spreads, from all of the pieces of image data acquired in step S402, based on the score read in step S41101. Furthermore, in a case where the score read in step S41101 is a score for individual page, here, candidate image data serving as a candidate for image data to be arranged in a template for individual page is acquired. Moreover, in a case where the score read in step S41101 is a score for common page, here, candidate image data serving as a candidate for image data to be arranged in a template for common page is acquired. In the first exemplary embodiment, the CPU 101 acquires, as candidate image data, image data having a score higher than or equal to a threshold value as the score read in step S41101. In a case where there is no image data having a score higher than or equal to the threshold value, the CPU 101 acquires, as candidate image data, image data having the highest score. Furthermore, while, here, the CPU 101 acquires candidate image data from all of the image data groups, the first exemplary embodiment is not limited to this. Image data previously selected in image selection processing described below can be excluded from targets for acquisition.

In step S41103, the CPU 101 sets the number of spreads based on a result of the scene segmentation performed in step S405 and the candidate image data acquired in step S41102. First, the CPU 101 specifies how many pieces of candidate image data belong to each scene. In the first exemplary embodiment, spread data is generated for each scene. Therefore, the CPU 101 specifies the number of pieces of spread data corresponding to each scene according to formula (5). Furthermore, the maximum number of pieces of image data per spread is determined according to an input entered in the number of spread photographs portion 306.

In the following description, first, a case where the score read in step S41101 is a score for individual page is described. Since spread data corresponding to an individual page is generated from an aggregation of pieces of spread data corresponding to each scene, the CPU 101 specifies the number of pieces of spread data corresponding to individual pages according to formula (6). S denotes a scene number allocated to each scene.

Number of pieces of spread data of scene $S$=ceil (number of pieces of candidate image data belonging to scene $S$ maximum number of pieces of image data per spread) (5)

Number of pieces of spread data corresponding to individual pages=$\Sigma_S$ number of pieces of spread data of scene $S$ (6)

Furthermore, in a case where the number of pieces of spread data corresponding to individual pages specified in formula (6) is larger than or equal to the number (total number of pieces of spread data) designated by the user in the number of spreads box 304, the CPU 101 re-specifies the number of pieces of spread data corresponding to individual pages according to the following formula (7).

Number of pieces of spread data corresponding to individual pages=total number of pieces of spread data−1 (7)

As mentioned above, in the first exemplary embodiment, a common page and an individual page are mixed in an album. To cause a spread composed of a common page to be included in an album, the above-mentioned specifying operation is performed. Furthermore, an upper limit value and a lower limit value can be set to the number of pieces of spread data corresponding to an individual page. Furthermore, in a case where the score read in step S41101 is a score for individual page about the album 1, the number of pieces of spread data corresponding to individual pages included in the album 1 is specified by the above-described processing. Then, in a case where the score read in step S41101 is a score for individual page about the album 2, the number of pieces of spread data corresponding to individual pages included in the album 2 is specified by the above-described processing.

Next, a case where the score read in step S41101 is a score for common page is described. Other than spreads corresponding to individual pages are spreads corresponding to common pages. Therefore, the CPU 101 specifies the number of pieces of spread data corresponding to common pages according to formula (8).

Number of pieces of spread data corresponding to common pages=total number of pieces of spread data−MIN(number of pieces of spread data corresponding to individual pages) (8)

Thus, in the first exemplary embodiment, a value obtained by subtracting the number of pieces of spread data corresponding to individual pages from the total number of pieces of spread data is the number of pieces of spread data corresponding to common pages.

Furthermore, while, in the first exemplary embodiment, the CPU 101 sets the number of pieces of spread data corresponding to individual pages and the number of pieces of spread data corresponding to common pages according to the number of pieces of candidate image data included in each scene, the first exemplary embodiment is not limited to this. For example, each number of pieces of spread data can be a number previously set in the album creation application or a number designated by the user.

In step S41104, the CPU 101 allocates the candidate image data acquired in step S41102 to each piece of spread data. Here, first, the CPU 101 segments the candidate image data acquired in step S41102 into image data groups the number of which corresponds to the number of pieces of spread data specified in step S41103. Furthermore, if the candidate image data acquired in step S41102 is candidate image data for individual page, the candidate image is segmented into image data groups the number of which corresponds to the number of spreads corresponding to individual pages. Moreover, if the candidate image data acquired in step S41102 is candidate image data for common page, the candidate image is segmented into image data groups the number of which corresponds to the number of spreads corresponding to common pages. Specifically, the CPU 101 arranges the candidate image data acquired in step S41102 in the order of image capturing time based on the information acquired in step S40301. Then, if a difference in image capturing time between adjacent pieces of image data is larger than a threshold value, the CPU 101 segments the candidate image data between the adjacent pieces of image data. This method of segmentation is repeated until image data groups the number of which corresponds to the number of spreads specified in step S41103 are formed. After that, the CPU 101 allocates the respective image data groups formed by segmentation to the top position of each spread of the album in order from an image data group which is top in image capturing date and time. Thus, the CPU 101 allocates image data groups to each spread of the album in the order of image capturing date and time. This enables creating an album in which pieces of image data are arranged in the order of image capturing date and time. Furthermore, within one double-page spread, images do not need to be arranged in the order of image capturing date and time.

In step S41105, the CPU 101 performs image selection processing for selecting pieces of image data to be arranged in a spread. Here, an example in which the CPU 101 selects four pieces of image data from a segmented image data group allocated to a certain spread is described with reference to FIGS. 7A, 7B, 7C, 7D, 7E, 7F, 7G, 7H, and 7I. Furthermore, the spread is an area for two pages, but each of the first spread (front cover) and the last spread (back cover) is an area for one page. Moreover, how many pieces of image data are selected in which spread data is determined, for example, according to, for example, an input entered by the user to the number of spread photographs portion 306. For example, in a case where the number of photographs that is based on an input entered by the user to the number of spread photographs portion 306 is four, the number of pieces of image data which are selected in step S41105 is determined in such a manner that the average number of pieces of image data included in each spread within the album becomes four. Therefore, the numbers of pieces of image data included in the respective spreads within the album can be different from each other. Moreover, if pieces of image data are selected from a segmented image data group for individual page, the above-mentioned processing is performed based on a score for individual page. Image data selected based on a score for individual page from a segmented image data group for individual page is individual image data. Moreover, if pieces of image data are selected from a segmented image data group for common page, the above-mentioned processing is performed based on a score for common page. Image data selected based on a score for common page from a segmented image data group for common page is common image data.

Figure 7:
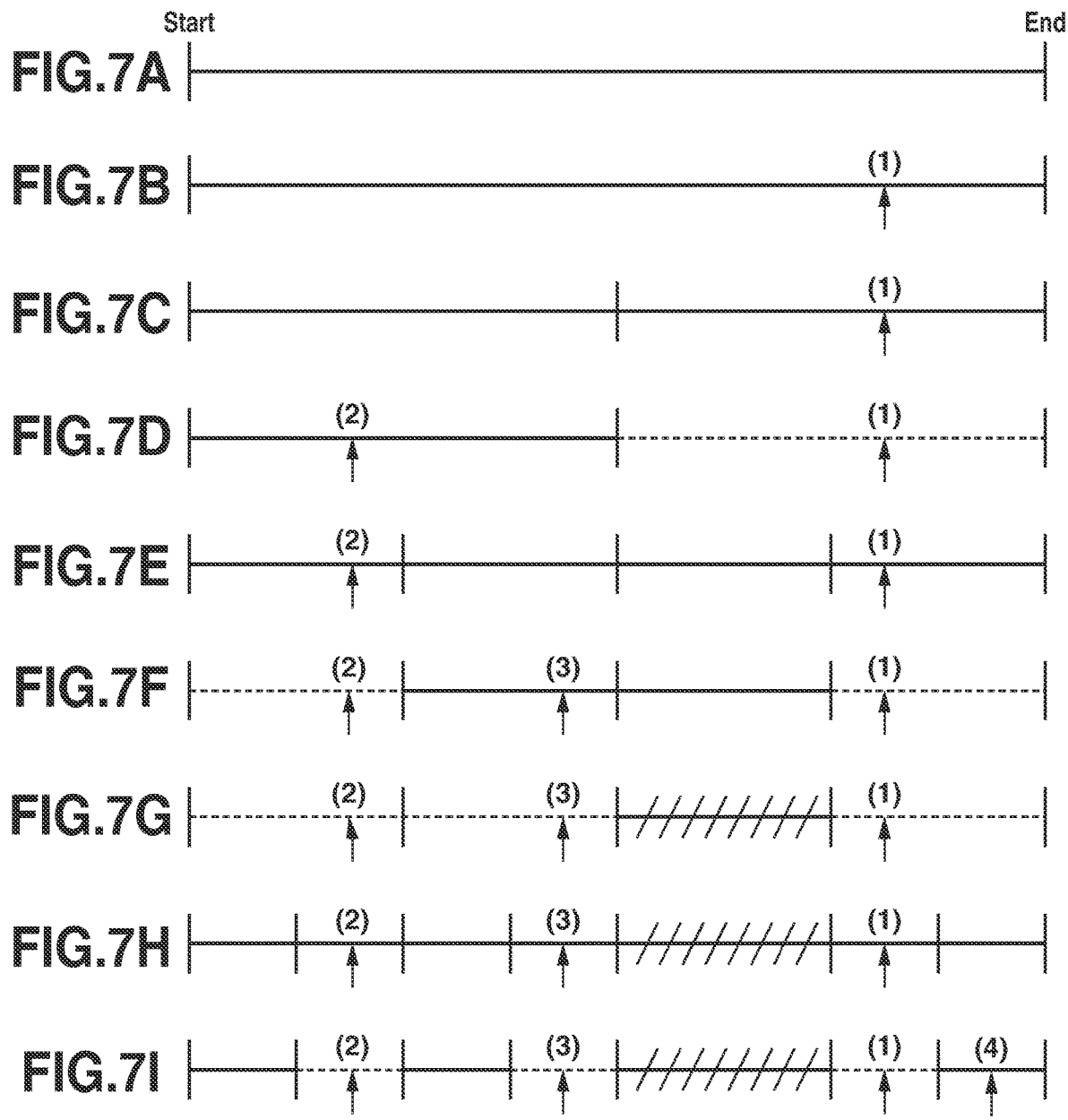
FIGS. 7A, 7B, 7C, 7D, 7E, 7F, 7G, 7H, and 7I are diagrams used to explain selection of image data.

FIG. 7A illustrates the time difference (segmented image capturing period) in the image capturing date and time between image data with the earliest image capturing date and time and image data with the latest image capturing date and time in a segmented image data group allocated to a spread, in other words, the image capturing period of the segmented image data group. Furthermore, here, selection of pieces of image data is performed in the order of a main slot and a sub-slot. Here, a template corresponding to a spread is assumed to contain one main slot. Therefore, image data to be selected as the first piece of image data is image data for the main slot. The CPU 101 selects, as image data for the main slot, image data (1) with the highest score specified in step S410 among pieces of image data corresponding to the segmented image capturing period illustrated in FIG. 7B.

Image data to be selected as the second or subsequent piece of image data is image data for the sub-slot. Selection of the second or subsequent piece of image data is performed according to a method such as that described in the following in such a way as not to concentrate on a part of the segmented image capturing period. First, the CPU 101 divides the segmented image capturing period into two periods as illustrated in FIG. 7C. Next, as illustrated in FIG. 7D, the CPU 101 selects the second piece of image data from pieces of image data generated in a segmented image capturing period (a period indicated by a solid line in FIG. 7D) in which the first piece of image data is not selected. Furthermore, the CPU 101 selects, as the second piece of image data, image data (2) with the highest score specified in step S410 among the pieces of image data generated in the segmented image capturing period in which the first piece of image data is not selected. Next, as illustrated in FIG. 7E, the CPU 101 divides each of the segmented image capturing periods illustrated in FIG. 7D into two periods. Then, as illustrated in FIG. 7F, the CPU 101 selects the third piece of image data from pieces of image data generated in segmented image capturing periods (periods indicated by a solid line in FIG. 7F) in which neither of the first piece of image data and the second piece of image data is selected. Furthermore, the CPU 101 selects, as the third piece of image data, image data (3) with the highest score specified in step S410 among the pieces of image data generated in the segmented image capturing periods in which neither of the first piece of image data and the second piece of image data is selected. Then, the CPU 101 selects, as the fourth piece of image data, image data with the highest score specified in step S410 among pieces of image data generated in a segmented image capturing period in which none of the first piece, the second piece, and the third piece of image data is selected.

Next, an example in which there is no image generated in a segmented image capturing period in which none of the first piece, the second piece, and the third piece of image data is selected and the fourth piece of image data is, therefore, not able to be selected from the segmented image capturing period is described. Here, as illustrated in FIG. 7G, there is assumed to be no image data generated in a segmented image capturing period in which image data is not yet selected (a period indicated by hatched lines in FIG. 7G). In that case, as illustrated in FIG. 7H, the CPU 101 divides each segmented image capturing period into two periods. Next, as illustrated in FIG. 7I, the CPU 101 selects the fourth piece of image data from pieces of image data generated in segmented image capturing periods which are other than the segmented image capturing periods recognized to contain no image data generated therein and in which image data is not yet selected (periods indicated by solid lines in FIG. 7I). Furthermore, the CPU 101 selects, as the fourth piece of image data, image data (4) with the highest score specified in step S410 among the pieces of image data generated in the segmented image capturing periods.

In step S41106, the CPU 101 acquires a plurality of templates corresponding to an input entered in the setting screen 301. The CPU 101 acquires a plurality of templates having designs corresponding to the commercial material designation portion 307. Furthermore, an input of, for example, the size of a margin to be left in each spread can be received in the setting screen 301, and each template to be acquired here can be determined according to, for example, the input margin. In this way, in the first exemplary embodiment, pieces of image data to be arranged in each template are automatically selected without the image processing apparatus 100 receiving a selection operation for image data from the user.

Figure 8:
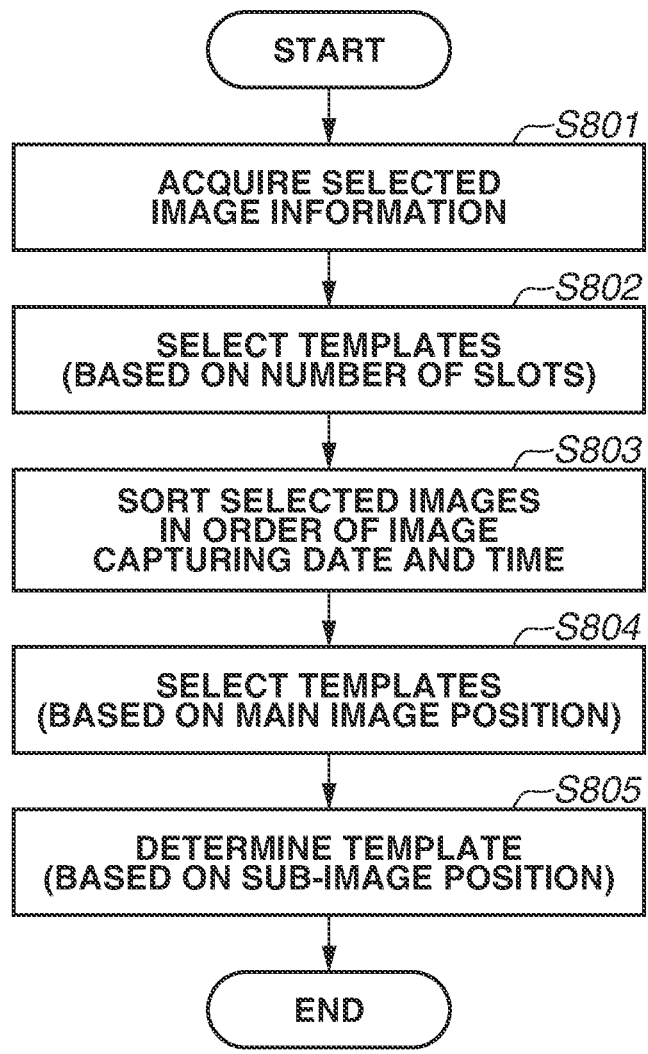
FIG. 8 is a flowchart illustrating processing for determining a template which is used to generate a layout image.

In step S41107, the CPU 101 determines an image layout of a spread targeted for processing, thus generating spread data. Specifically, first, the CPU 101 determines a template suitable for laying out pieces of image data selected in step S41105 from among the plurality of templates acquired in step S41106. FIG. 8 is a flowchart illustrating processing for determining a template used for generation of a layout image in the first exemplary embodiment.

In step S801, the CPU 101 acquires the number of pieces of image data selected in step S41105 and information about the image data. The information about image data refers to, for example, the width and height of an image represented by the image data, image capturing date and time information about the image data, and a score of the image data. Furthermore, here, the number of pieces of image data selected in step S41105 is assumed to be three.

In step S802, the CPU 101 selects a template having slots the number of which coincides with the number of pieces of image data selected in step S41105. Furthermore, since the number of pieces of image data selected in step S41105 is three, a template having slots the number of which is three is selected. Here, as a template having slots the number of which is three, templates (1-1) to (4-4) illustrated in FIG. 9 are assumed to be selected.

In step S803, the CPU 101 sorts the pieces of image data selected in step S41105 in order of the image capturing date and time. Furthermore, here, the image capturing date and time of each of images respectively represented by three pieces of image data is assumed to be in such order as indicated by arrow (A) illustrated in FIG. 9. Moreover, here, an image 905 is assumed to be an image for main slot (a main image), and each of an image 906 and an image 907 is assumed to be an image for sub-slot (a sub-image).

In step S804, the CPU 101 selects a template suitable for a main image from among the templates selected in step S802. In the present exemplary embodiment, image data with the earlier image capturing date and time is assumed to be laid out in a slot closer to the upper left corner of a template, and image data with the later image capturing date and time is assumed to be laid out in a slot closer to the lower right corner of the template. Therefore, first, the CPU 101 selects a template in which the position of a main slot corresponds to the order of the image capturing date and time of image data representing a main image, from among the templates selected in step S802. More specifically, for example, in a case where the order of the image capturing date and time of image data representing a main image is the oldest, a template in which the main slot is the first slot from left of all of the slots is selected. Furthermore, since pieces of image data are sorted in order of the image capturing date and time, the CPU 101 is able to recognize the order of the image capturing date and time of image data representing a main image. Moreover, the CPU 101 finally selects a template in which the aspect ratio of a slot to be used for arranging a main image therein coincides with (or is close to) the aspect ratio of the main image, from among the templates selected in the above-mentioned way. Then, since the image 905, which is a main image, is an image the image capturing date and time of which is latest and which is portrait-oriented, here, templates (3-1) to (3-4) illustrated in FIG. 9 are selected.

In step S805, the CPU 101 selects a template suitable for a sub-image from among the templates selected in step S804. Specifically, first, the CPU 101 selects a template in which the position of a sub-slot corresponds to the order of the image capturing date and time of image data representing a sub-image. Moreover, the CPU 101 finally selects a template in which the aspect ratio of the sub-slot coincides with (or is close to) the aspect ratio of the sub-image, from among the templates selected in the above-mentioned way. Here, the image 906, which is a sub-image, is an image the image capturing date and time of which is earliest and which is portrait-oriented. Moreover, the image 907, which is a sub-image, is an image the image capturing date and time of which is the second latest and which is landscape-oriented. Therefore, a template (3-2) illustrated in FIG. 9 is selected. Furthermore, at this time, in which sub-slot which sub-image is arranged is also specified.

In this way, the CPU 101 determines a template to be used for generating a layout image corresponding to a spread and determines in which slot of the template which image to lay out, thus generating spread data. Specifically, the CPU 101 manages information about the slots included in the selected template and pieces of image data corresponding to images to be laid out in the respective slots, in association with each other. Thus, spread data includes a template for use in a spread and pieces of image data arranged in the template. In the above-described way, in the first exemplary embodiment, a template for use in each page is automatically selected without the image processing apparatus 100 receiving a selection operation for image data from the user. Moreover, in the first exemplary embodiment, pieces of image data are automatically arranged in a template without the image processing apparatus 100 receiving an arrangement operation for image data from the user. Furthermore, the above-described processing is performed to generate spread data corresponding to an individual page (individual page data) and spread data corresponding to a common page (common page data). Furthermore, while, in the above description, data is generated on a spread-by-spread basis, data can be generated on a page-by-page basis.

In step S41108, the CPU 101 determines whether the processing in steps S41105 to S41107 has been completed with respect to all of the pieces of spread data. Furthermore, in a case where a score for individual page has been read in step S41101, the term "all of the pieces of spread data" as used in step S41108 refers to all of the pieces of spread data corresponding to individual pages. Moreover, in a case where a score for common page has been read in step S41101, the term "all of the pieces of spread data" as used in step S41108 refers to all of the pieces of spread data corresponding to common pages. If it is determined that the processing has not yet been completed (NO in step S41108), the CPU 101 returns the processing to step S41105, and, then, the CPU 101 performs the processing in steps S41105 to S41107 with respect to a spread that is not yet targeted for processing. On the other hand, if it is determined that the processing has been completed by the CPU 101 (YES in step S41108), the CPU 101 advances the processing to step S41109.

In step S41109, the CPU 101 determines whether all of the scores specified in step S410 (here, scores for individual page concerning the album 1, scores for individual page concerning the album 2, and scores for common page) have been completely read in step S41101. In other words, the CPU 101 determines whether specifying templates with respect to respective individual pages and common pages constituting a plurality of albums designated by the user to be created has been performed. If it is determined that the processing has not yet been completed (NO in step S41109), the CPU 101 returns the processing to step S41101, and, then, the CPU 101 reads a score which has not yet been read and performs the processing in steps S41102 to S41108. On the other hand, if it is determined that the processing has been completed (YES in step S41109), the CPU 101 advances the processing to step S412.

In step S412, the CPU 101 performs spread joining processing for joining the generated pieces of spread data and thus generating album data. Here, the CPU 101 creates a layout of the entire album by appending page number information corresponding to a page number in the album to each piece of spread data. Moreover, at this time, the CPU 101 arranges pieces of spread data in such a manner that the page number of a page in which pieces of image data the image capturing times of which are earlier are arranged becomes smaller, based on the image capturing times of pieces of image data arranged in a template within each piece of spread data, and then joins the pieces of spread data. FIG. 10 is a flowchart illustrating the spread joining processing, which is performed by the album creation application according to the first exemplary embodiment.

In step S1001, the CPU 101 acquires spread data concerning one album out of pieces of spread data generated in step S411. In the first exemplary embodiment, for example, the term "spread data concerning the album 1" refers to "spread data for common page+spread data for individual page concerning the album 1".

In step S1002, the CPU 101 specifies a value serving as a criterion of sort (sort criterion value) with respect to each piece of spread data acquired in step S1001. In the first exemplary embodiment, the sort criterion value is assumed to be an average image capturing time of pieces of image data arranged in spread data. Furthermore, the sort criterion value is not limited to the average image capturing time. For example, the sort criterion value can be an average image capturing position (latitude and longitude) of pieces of image data arranged in spread data, or can be the number of pieces of image data arranged in spread data. Moreover, for example, the sort criterion value can be image analysis information (for example, color histogram) about pieces of image data arranged in spread data.

In step S1003, the CPU 101 sorts pieces of spread data acquired in step S1001 based on the sort criterion value specified in step S1002. Since, as mentioned above, in the first exemplary embodiment, the sort criterion value is an average image capturing time, the CPU 101 arranges pieces of spread data in such a manner that the page number of spread data the average image capturing time of which is earlier becomes smaller.

In step S1004, the CPU 101 determines whether the number of pieces of spread data acquired in step S1001 is equal to the total number of pieces of spread data. If it is determined that the number of pieces of spread data acquired in step S1001 is not equal to the total number of pieces of spread data (NO in step S1004), the CPU 101 advances the processing to step S1005. Then, if it is determined that the number of pieces of spread data acquired in step S1001 is equal to the total number of pieces of spread data (YES in step S1004), the CPU 101 advances the processing to step S1006.

In step S1005, the CPU 101 deletes any unnecessary spread data out of the pieces of spread data acquired in step S1001, thus performing adjustment in such a manner that the number of pieces of spread data about an album targeted for processing becomes the total number of pieces of spread data. In the first exemplary embodiment, the CPU 101 adjusts the number of pieces of spread data by selecting any spread data targeted for deletion out of pieces of spread data for common page. Specifically, the CPU 101 deletes, out of pieces of spread data for common page, spread data the average image capturing time of which is closest to the average image capturing time of any spread data for individual page. The CPU 101 repeats this deletion processing, thus adjusting the number of pieces of spread data. Furthermore, the term "average image capturing time" refers to an average of image capturing times of a plurality of pieces of image data included in spread data. After that, the CPU 101 returns the processing to step S1004. Furthermore, while, in the first exemplary embodiment, the CPU 101 selects spread data targeted for deletion out of pieces of spread data for common page and does not select spread data targeted for deletion out of pieces of spread data for individual page, the first exemplary embodiment is not limited to this. For example, the CPU 101 can be configured to select spread data targeted for deletion out of pieces of spread data for individual page and not to select spread data targeted for deletion out of pieces of spread data for common page. Moreover, for example, the CPU 101 can be configured to select spread data targeted for deletion out of both pieces of spread data for individual page and pieces of spread data for common page. When the number of pieces of spread data has been fixed in the above-mentioned way, the CPU 101 joins the pieces of spread data remaining without being deleted in the order determined by sorting performed in step S1003, thus generating album data.

In step S1006, the CPU 101 determines whether the processing in steps S1001 to S1005 has been performed with respect to pieces of spread data concerning all of the albums designated to be created via the setting screen 301. In other words, the CPU 101 determines whether album data concerning all of the albums designated to be created via the setting screen 301 has been generated. If it is determined that the processing in steps S1001 to S1005 has not been performed with respect to pieces of spread data concerning all of the albums (NO in step S1006), the CPU 101 returns the processing to step S1001, in which the CPU 101 acquires spread data concerning an album which has not yet been acquired and then performs processing on the acquired spread data. If it is determined that the processing in steps S1001 to S1005 has been performed with respect to pieces of spread data concerning all of the albums (YES in step S1006), the CPU 101 ends the spread joining processing and advances the processing to step S413.

In step S413, the CPU 101 outputs the generated album data. As outputting of album data, the CPU 101 is able to perform, for example, displaying of album data on the display 105, transmission of album data, and printing of an album that is based on album data. For example, the CPU 101 is able to transmit generated album data to a printer, thus causing the printer to print an album that is based on the generated album data.

In the first exemplary embodiment, the user is assumed to be allowed to optionally edit completed spread data. For example, in a case where there is image data which the user desires to change among pieces of image data arranged in the respective slots, the user clicks on the image data which the user desires to change with the mouse 107. After that, the user selects image data to be arranged instead of the image data which the user desires to change, so that the image data optionally selected by the user can be newly arranged instead of the clicked-on image data. Furthermore, in a case where image data which the user desires to change has been clicked on, the CPU 101 can display a candidate for image data to be obtained by changing. Moreover, for example, in a case where image data which the user desires to change is image data in an individual page, the CPU 101 can display, as a candidate for image data to be obtained by changing, image data the score for individual page of which is high. Similarly, in a case where image data which the user desires to change is image data in a common page, the CPU 101 can display, as a candidate for image data to be obtained by changing, image data the score for common page of which is high.

In this way, in the first exemplary embodiment, the album creation application is able to generate album data for creating an album including a common page and an individual page. Moreover, a criterion of selecting image data to be arranged in a common page and a criterion of selecting image data to be arranged in an individual page are controlled to be different from each other. Performing such control enables selecting image data suitable for a common page as image data to be arranged in a common page and selecting image data suitable for an individual page as image data to be arranged in an individual page. Moreover, image data to be arranged in a common page and image data to be arranged in an individual page can be prevented or reduced from becoming the same.

In the above-described first exemplary embodiment, pieces of image data belonging to the same scene are used for both spread data for common page and spread data for individual page. In a second exemplary embodiment, pieces of image data belonging to the same scene are used for only any one of spread data for common page and spread data for individual page. This prevents or reduces pieces of image data belonging to the same scene from being included in both spread data for common page and spread data for individual page.

Furthermore, unless otherwise stated, the configuration of the second exemplary embodiment is assumed to be similar to the configuration of the first exemplary embodiment.

Figure 11A:
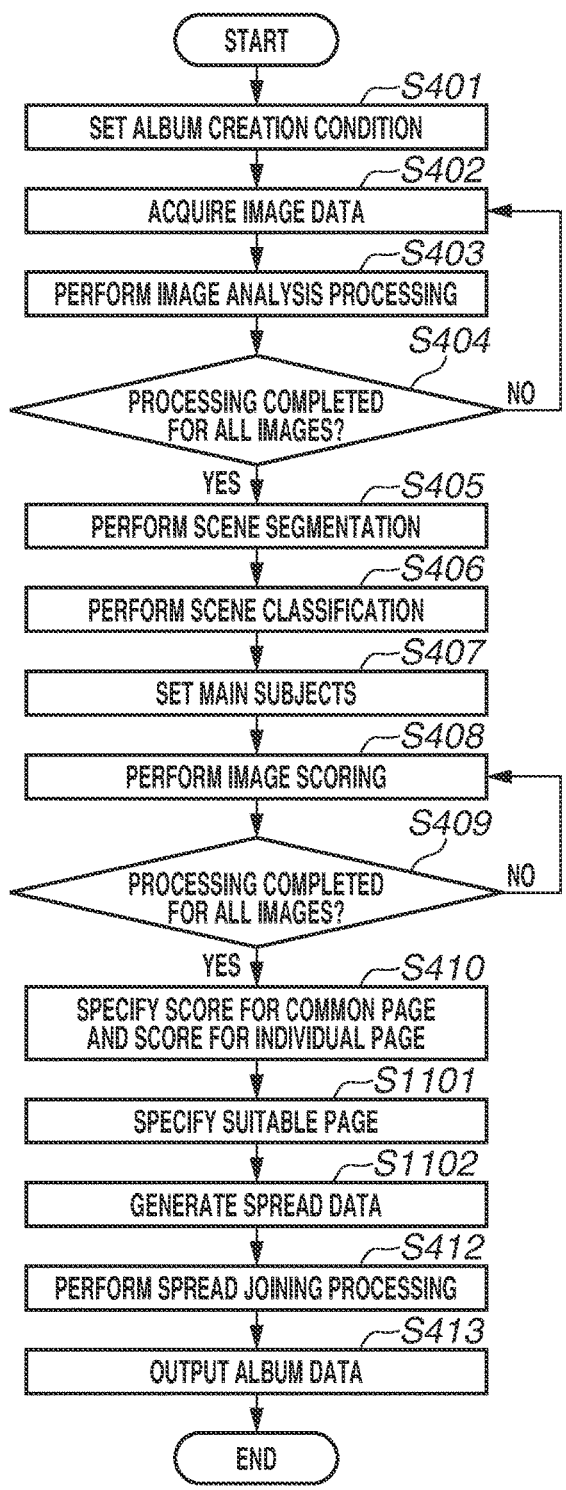
FIGS. 11A, 11B, and 11C are flowcharts illustrating automatic layout processing which is performed by the album creation application.
Figure 11B:
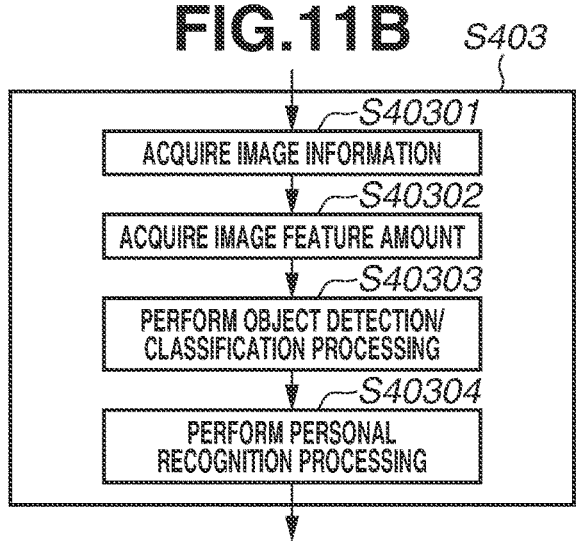
Figure 11C:
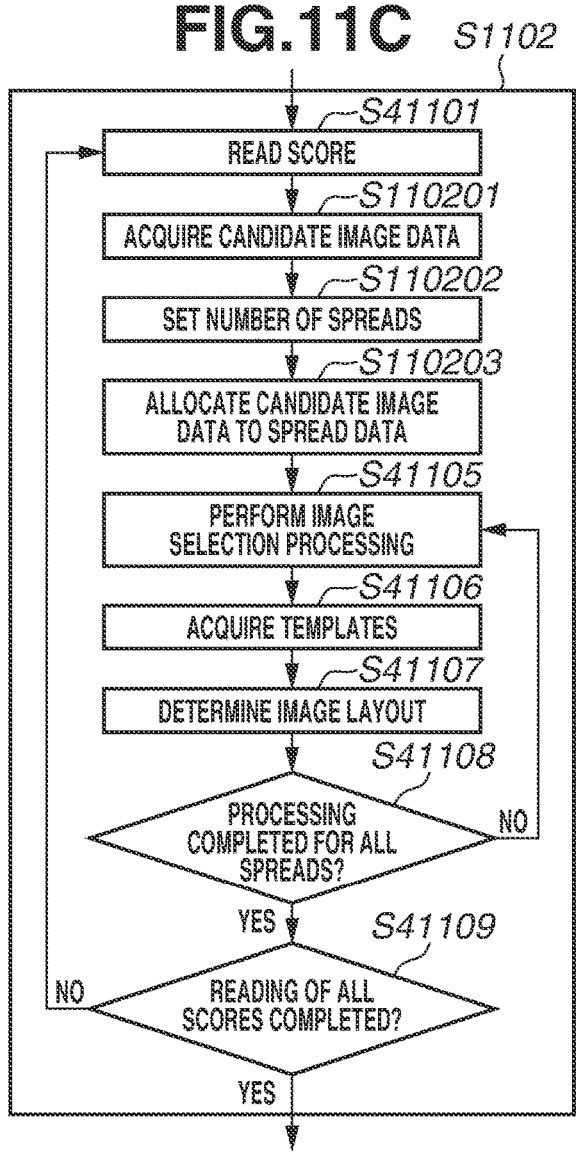

FIGS. 11A, 11B, and 11C are flowcharts illustrating automatic layout processing which is performed by an album creation application according to the second exemplary embodiment. The flowcharts illustrated in FIGS. 11A to 11C are implemented, for example, by the CPU 101 loading a program corresponding to the album creation application stored in the HDD 104 onto the ROM 102 or the RAM 103 and executing the program.

Processing in steps S401 to S410 is similar to the processing described above in the first exemplary embodiment.

In step S1101, the CPU 101 specifies for which of a common page and an individual page each scene is suitable. In other words, the CPU 101 specifies which of a score for common page and a score for individual page is to be applied for each scene. An image data group included in a scene suitable for a common page is a common image data group, and an image data group included in a scene suitable for an individual page is an individual image data group. In the second exemplary embodiment, the CPU 101 specifies which of a score for common page and a score for individual page is to be applied for each scene according to the following formulae (9) and (10).

$$^SQ_P = \Sigma_{I \in S}{}^IT_P \qquad (9)$$

$$^IT_P = \begin{cases} 1' & (^Iscore_P > THR) \\ 0 & \text{(otherwise)} \end{cases} \qquad (10)$$

$^Iscore_P$ denotes the value of a score P assigned to image data I, S denotes a scene number allocated to a scene targeted for determination, and THR denotes a threshold value. $^SQ_P$ is an index indicating how suitable for a scene targeted for determination a page corresponding to the score P is. Furthermore, the score P is one of a score Pd for individual page and a score Pc for common page.

In a case where the score P is a score for individual page, the CPU 101 calculates a value $^IT_{Pd}$, which indicates whether the image data I is suitable for an individual page, according to formula (10). Then, in a case where the score P is a score for common page, the CPU 101 calculates a value $^IT_{Pc}$, which indicates whether the image data I is suitable for a common page, according to formula (10). As a result, with respect to image data the score for individual page of which is higher than the threshold value, a value indicating that the image data I is suitable for an individual page is calculated according to formula (10). Then, with respect to image data the score for common page of which is higher than the threshold value, a value indicating that the image data I is suitable for a common page is calculated according to formula (10).

After that, in a case where the score P is a score for individual page, the CPU 101 calculates a value $^SQ_{Pd}$, which indicates how many pieces of image data suitable for an individual page are included in a scene targeted for determination, according to formula (9). Moreover, in a case where the score P is a score for common page, the CPU 101 calculates a value $^SQ_{Pc}$, which indicates how many pieces of image data suitable for a common page are included in a scene targeted for determination, according to formula (9).

Then, the CPU 101 specifies for which of a common page and an individual page a scene targeted for determination is suitable based on the index $^SQ_{Pc}$ concerning the score Pc for common page and the index $^SQ_{Pd}$ concerning the score Pd for individual page specified according to formulae (9) and (10). Specifically, the CPU 101 specifies generating spread data in which pieces of image data belonging to the scene targeted for determination are arranged, with use of a score corresponding to the larger one in value of the index $^SQ_{Pc}$ concerning the score Pc for common page and the index $^SQ_{Pd}$ concerning the score Pd for individual page. The CPU 101 repeats the present processing with respect to all of the scenes and is thus able to specify which scene is suitable for which of an individual page and a common page. With this, image data belonging to a scene is used for only a page suitable for the scene out of a common page and an individual page. According to the present processing, for example, applying a score for common page to scenes (1) to (6) illustrated in FIG. 5B and applying a score for individual page to scenes (7) to (10) illustrated in FIG. 5B are specified.

Furthermore, while, in the second exemplary embodiment, a score for individual page and a score for common page of image data included in each scene are used as indexes for specifying for which of a common page and an individual page each scene is suitable, the second exemplary embodiment is not limited to this. For example, indexes such as the largeness or smallness of the number of pieces of image data in which a main subject is shown, the largeness or smallness of the number of pieces of image data in which the number of shown faces is large, and the number of pieces of image data in each scene can be used. Moreover, for which of a common page and an individual page each scene is suitable can be specified based on types of scenes determined as a result of scene segmentation performed in step S406. For example, a scene classified into "wedding ceremony" is specified to be suitable for a common page in which the bride and groom are set as main subjects, and a scene classified into "wedding reception" is specified to be suitable for an individual page in which family members or friends are set as main subjects. In this way, information about which type of scene is specified to be suitable for which page can be previously incorporated in the album creation application.

Furthermore, while, in the above description, the method of using formulae (9) and (10) as a method for specifying which scene is suitable for which of an individual page and a common page has been described, the second exemplary embodiment is not limited to this. For example, the following method can be used to specify which scene is suitable for which of an individual page and a common page.

For example, the CPU 101 calculates an average value of scores for common page and an average value of scores for individual page of pieces of image data included (contained) in a scene targeted for determination. Then, in a case where the average value of scores for common page is larger than the average value of scores for individual page, the CPU 101 determines that the scene targeted for determination is suitable for a common page. Moreover, in a case where the average value of scores for individual page is larger than the average value of scores for common page, the CPU 101 determines that the scene targeted for determination is suitable for an individual page.

Moreover, for example, the CPU 101 calculates the maximum value of scores for common page of pieces of image data included in a scene targeted for determination and the maximum value of scores for individual page of pieces of image data included in the scene targeted for determination. Then, in a case where the maximum value of scores for common page is larger than the maximum value of scores for individual page, the CPU 101 determines that the scene targeted for determination is suitable for a common page. Moreover, in a case where the maximum value of scores for individual page is larger than the maximum value of scores for common page, the CPU 101 determines that the scene targeted for determination is suitable for an individual page.

In step S1102, the CPU 101 generates spread data representing a spread included in an album with use of the scores specified in step S410. FIG. 11C is a flowchart illustrating spread data generation processing which is performed by the album creation application according to the second exemplary embodiment.

Processing in step S41101 is similar to the processing described above in the first exemplary embodiment.

In step S110201, the CPU 101 acquires candidate image data, which serves as a candidate for image data to be arranged in a template, from pieces of image data belonging to a scene corresponding to the score read in step S41101, based on the score read in step S41101. In a case where the score read in step S41101 is a score for individual page, the scene corresponding to the score read in step S41101 is a scene specified to be suitable for an individual page in step S1101. Moreover, in a case where the score read in step S41101 is a score for common page, the scene corresponding to the score read in step S41101 is a scene specified to be suitable for a common page in step S1101. Furthermore, in a case where the score read in step S41101 is a score for individual page, here, candidate image data serving as a candidate for image data to be arranged in a template for individual page is acquired. Moreover, in a case where the score read in step S41101 is a score for common page, here, candidate image data serving as a candidate for image data to be arranged in a template for common page is acquired. In the second exemplary embodiment, the CPU 101 acquires, as candidate image data, image data having a score larger than or equal to a threshold value as the score read in step S41101. In a case where there is no image data having a score larger than or equal to the threshold value, the CPU 101 acquires, as candidate image data, image data having the highest score. Furthermore, image data previously selected in image selection processing described below can be excluded from targets for acquisition.

In step S110202, the CPU 101 sets the number of spreads based on a result of the scene segmentation performed in step S405 and the candidate image data acquired in step S110201. While the details of the present processing are similar to those described in step S41103 in the first exemplary embodiment, a difference from the first exemplary embodiment is described in the following description. In the first exemplary embodiment, even if the score read in step S41101 is a score for individual page or a score for common page, the CPU 101 specifies the number of spreads with respect to all of the scenes by applying formula (5). However, in the second exemplary embodiment, in a case where the score read in step S41101 is a score for individual page, the CPU 101 specifies the number of spreads with respect to only a scene specified to be suitable for an individual page in step S1101. Moreover, in a case where the score read in step S41101 is a score for common page, the CPU 101 specifies the number of spreads with respect to only a scene specified to be suitable for a common page in step S1101.

In step S110203, the CPU 101 segments the candidate image data acquired in step S110201 into image data groups the number of which corresponds to the number of spreads specified in step S110202. Details of the present processing are similar to those described in step S41104 in the first exemplary embodiment. After that, the CPU 101 advances the processing to step S41105.

The subsequent processing is similar to the processing described in the first exemplary embodiment.

With such control being performed, in the second exemplary embodiment, pieces of image data belonging to the same scene are controlled to be used for only any one of spread data for common page and spread data for individual page. This prevents or reduces pieces of image data belonging to the same scene from being included in both spread data for common page and spread data for individual page.

As mentioned above, one or a plurality of pieces of image data is included in each scene. One image data group included in one scene is referred to as a "scene image data group". In the above-described first exemplary embodiment, both image data used for spread data for common page and image data used for spread data for individual page are acquired from each of all of the scene image data groups. In a third exemplary embodiment, image data used for spread data for common page is acquired from each of all of the scene image data groups. Then, image data used for spread data for individual page is not acquired from each of all of the scene image data groups but is acquired from only some scene image data groups.

Furthermore, unless otherwise stated, the configuration of the third exemplary embodiment is assumed to be similar to the configuration of the first exemplary embodiment.

Figure 12A:
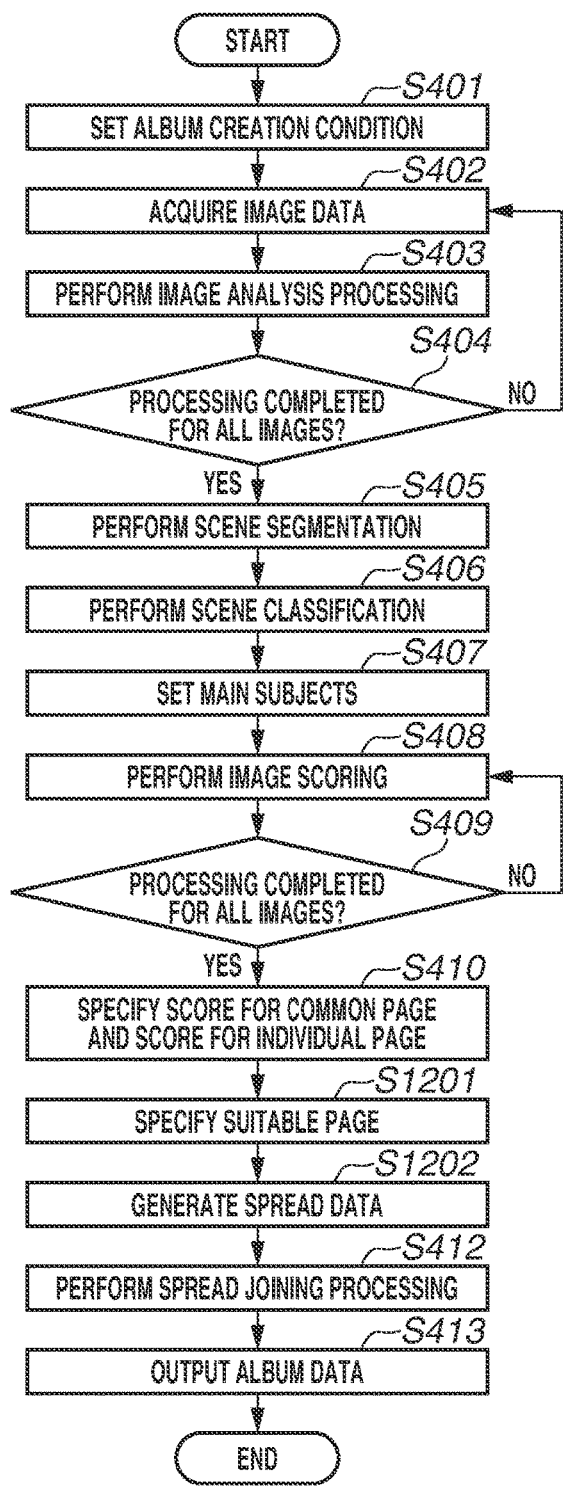
FIGS. 12A, 12B, and 12C are flowcharts illustrating automatic layout processing which is performed by the album creation application.
Figure 12B:
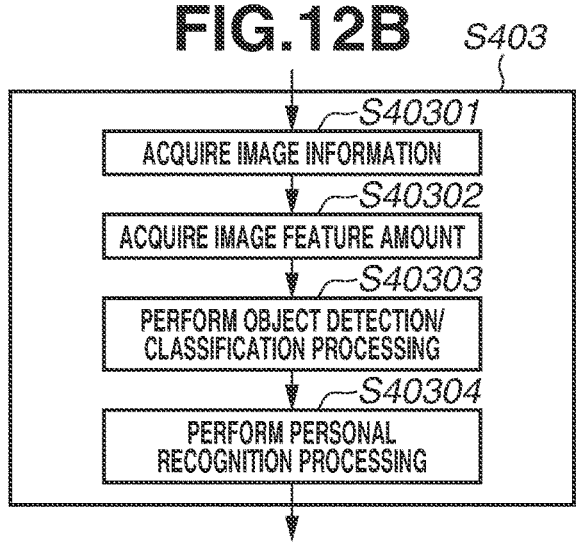
Figure 12C:
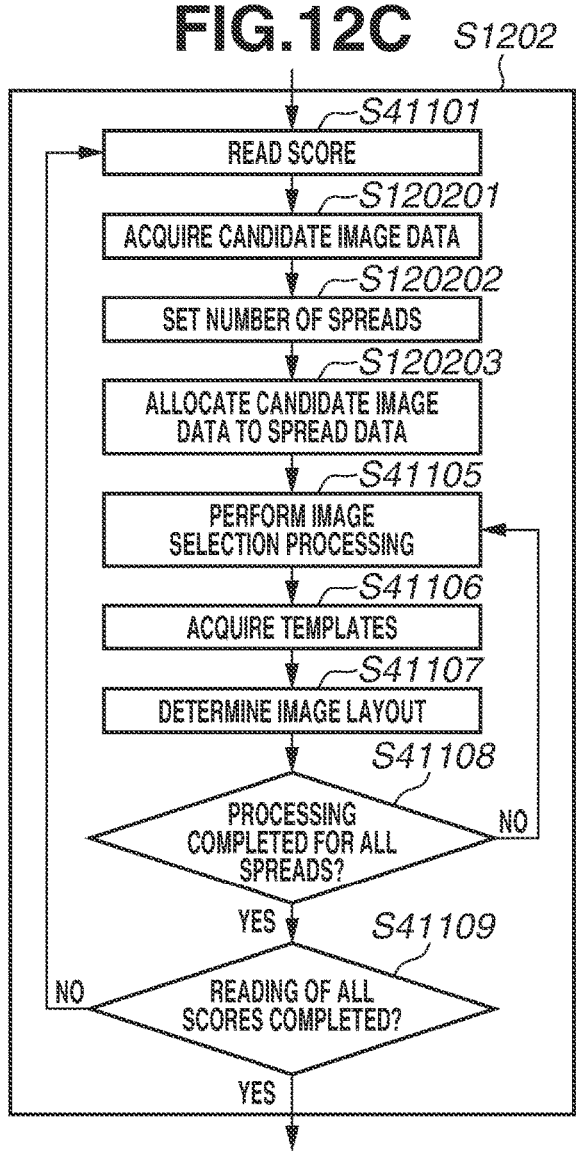
Figure 13A:
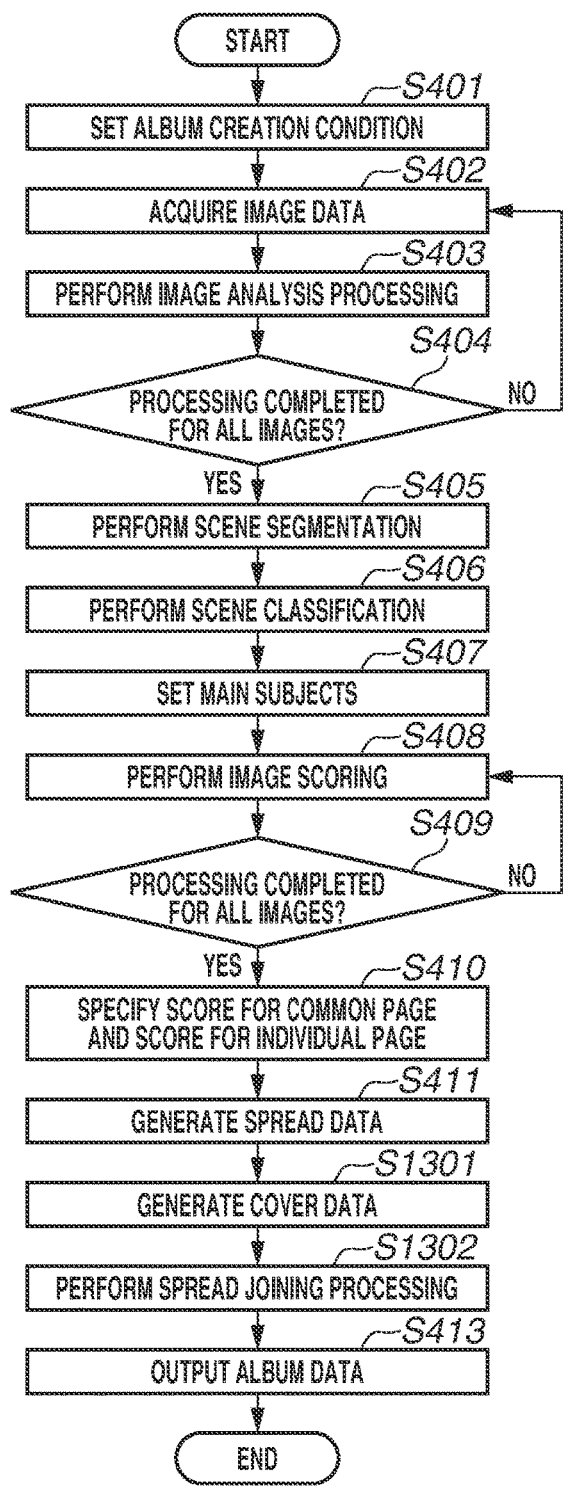
Figure 13B:
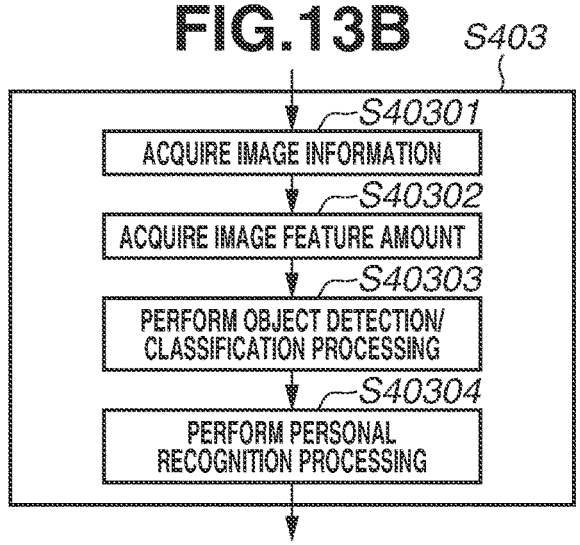
Figure 13C:
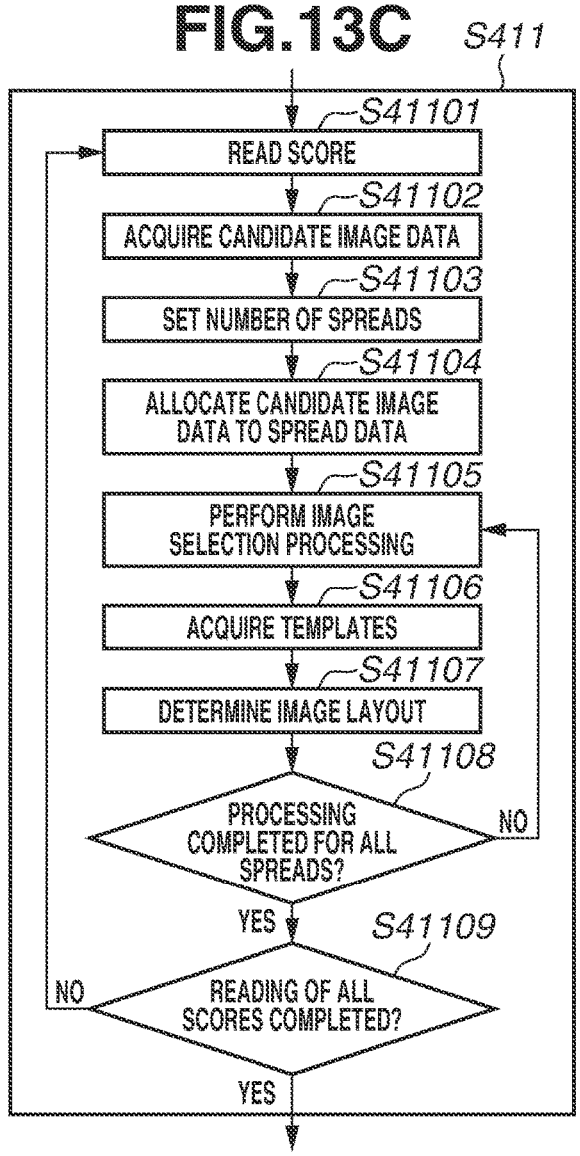

FIGS. 12A, 12B, and 12C are flowcharts illustrating automatic layout processing which is performed by an album creation application according to the third exemplary embodiment. The flowcharts illustrated in FIGS. 12A to 12C are implemented, for example, by the CPU 101 loading a program corresponding to the album creation application stored in the HDD 104 onto the ROM 102 or the RAM 103 and executing the program.

Processing in steps S401 to S410 is similar to the processing described above in the first exemplary embodiment.

In step S1201, the CPU 101 specifies whether each scene is suitable for an individual page. In other words, the CPU 101 specifies which of a score for common page and a score for individual page is to be applied for each scene. For example, applying a score for common page to scenes (1) to (8) illustrated in FIG. 5A and applying a score for individual page to scenes (2) and (5) illustrated in FIG. 5A are specified. In the third exemplary embodiment, applying a score for common page to all of the scenes is specified. Then, the CPU 101 specifies to which scene to apply a score for individual page according to the following formulae (11) and (12), which are the same as formulae (9) and (10) described in the second exemplary embodiment.

$$^SQ_P = \Sigma_{I \in S} {}^I T_P \tag{11}$$

$$^I T_P = \begin{cases} 1 & (^I score_P > THR) \\ 0 & (\text{otherwise}) \end{cases} \tag{12}$$

As mentioned in the description of formulae (9) and (10), the CPU 101 calculates an index $^SQ_{Pd}$ concerning the score Pd for individual page. Then, in a case where the index $^SQ_{Pd}$ concerning the score Pd for individual page is larger than or equal to a threshold value THR2, the CPU 101 determines that the scene targeted for determination is suitable for an individual page. Moreover, in a case where the index $^SQ_{Pd}$ concerning the score Pd for individual page is smaller than the threshold value THR2, the CPU 101 determines that the scene targeted for determination is not suitable for an individual page. The CPU 101 repeats the present processing with respect to all of the scenes and is thus able to specify which scene is suitable for an individual page.

Furthermore, while, in the third exemplary embodiment, a score for individual page of image data included in each scene is used as an index for specifying whether each scene is suitable for an individual page, the third exemplary embodiment is not limited to this. For example, indexes such as the largeness or smallness of the number of pieces of image data in which a main subject is shown, the largeness or smallness of the number of pieces of image data in which the number of shown faces is large, and the number of pieces of image data in each scene can be used. Moreover, whether each scene is suitable for an individual page can be specified based on types of scenes determined as a result of scene segmentation performed in step S406. For example, a scene classified into "wedding reception" is specified to be suitable for an individual page in which family members or friends are set as main subjects. In this way, information about which type of scene is specified to be suitable for an individual page can be previously incorporated in the album creation application.

In step S1202, the CPU 101 generates spread data representing a spread included in an album with use of the scores specified in step S410. FIG. 12C is a flowchart illustrating spread data generation processing which is performed by the album creation application according to the third exemplary embodiment.

Processing in step S41101 is similar to the processing described above in the first exemplary embodiment.

In step S120201, the CPU 101 acquires candidate image data, which serves as a candidate for image data to be arranged in a template, from pieces of image data belonging to a scene corresponding to the score read in step S41101, based on the score read in step S41101. In a case where the score read in step S41101 is a score for individual page, the scene corresponding to the score read in step S41101 is a scene specified to be suitable for an individual page in step S1201. Moreover, in a case where the score read in step S41101 is a score for common page, the scene corresponding to the score read in step S41101 is each of all of the scenes. Furthermore, in a case where the score read in step S41101 is a score for individual page, here, candidate image data serving as a candidate for image data to be arranged in a template for individual page is acquired. Moreover, in a case where the score read in step S41101 is a score for common page, here, candidate image data serving as a candidate for image data to be arranged in a template for common page is acquired. In the third exemplary embodiment, the CPU 101 acquires, as candidate image data, image data having a score larger than or equal to a threshold value as the score read in step S41101. In a case where there is no image data having a score larger than or equal to the threshold value, the CPU 101 acquires, as candidate image data, image data having the highest score. Furthermore, image data previously selected in image selection processing described below can be excluded from targets for acquisition.

Moreover, in the third exemplary embodiment, the CPU 101 selects candidate image data according to the following formula (13).

$$^IC_P = \begin{cases} 1 & (I \in SI_P \text{ \& } {^I}score_{p=P1} \geq THR \text{ \& } {^I}score_{p \neq P1} < {^I}score_{p=P1}) \\ 0 & \text{(otherwise)} \end{cases} \quad (13)$$

$^IC_P$ denotes a value indicating whether image data I is selected as candidate image data in a case where the score read in step S41101 is any one score P of a score P1 for individual page and a score P2 for common page. SI denotes an aggregation of pieces of image data belonging to a scene S corresponding to the score P. $^Iscore_{p=p1}$ and $^Iscore_{p \neq P1}$ denote a score P1 for individual page of the image data I and a score other than the score P1 for individual page of the image data I (i.e., a score P2 for common page), respectively. THR denotes a threshold value. In a case where the value $^IC_P$ is 1, the value $^IC_P$ indicates that the image data I is selected as candidate image data, and, in a case where the value $^IC_P$ is 0, the value $^IC_P$ indicates that the image data I is not selected as candidate image data.

With this, image data the score for individual page of which is higher than the score for common page thereof is selected as candidate image data serving as a candidate for image data to be arranged in a template for individual page. Moreover, image data the score for common page of which is higher than the score for individual page thereof is selected as candidate image data serving as a candidate for image data to be arranged in a template for common page. Employing such a configuration enables preventing or reducing the same image data from being used for both an individual page and a common page. Furthermore, the method for selecting image data according to the above-mentioned formulae can also be applied in, for example, the first exemplary embodiment and the second exemplary embodiment.

In step S120202, the CPU 101 sets the number of spreads based on a result of the scene segmentation performed in step S405 and the candidate image data acquired in step S120201. While the details of the present processing are similar to those described in step S41103 in the first exemplary embodiment, a difference from the first exemplary embodiment is described in the following description. In the first exemplary embodiment, even if the score read in step S41101 is a score for individual page or a score for common page, the CPU 101 specifies the number of spreads with respect to all of the scenes by applying formula (5). However, in the third exemplary embodiment, in a case where the score read in step S41101 is a score for individual page, the CPU 101 specifies the number of spreads with respect to only a scene specified to be suitable for an individual page in step S1201. On the other hand, in a case where the score read in step S41101 is a score for common page, the CPU 101 specifies the number of spreads with respect to all of the scenes.

In step S120203, the CPU 101 segments the candidate image data acquired in step S120201 into image data groups the number of which corresponds to the number of spreads specified in step S120202. Details of the present processing are similar to those described in step S41104 in the first exemplary embodiment. After that, the CPU 101 advances the processing to step S41105.

The subsequent processing is similar to the processing described in the first exemplary embodiment.

In this way, in the third exemplary embodiment, since all of the scenes serve as a candidate for selecting an image for common page, as compared with a configuration in which only some scenes serve as a candidate for selecting an image for common page, the possibility of a better image being selected as an image for common page increases. Moreover, since only some scenes serve as a candidate for selecting an image for individual page, an image selected as an image for common page and an image selected as an image for individual page can be prevented or reduced from becoming the same image.

Furthermore, in the third exemplary embodiment, image data used for spread data for common page is acquired from each of all of the scene image data groups, and image data used for spread data for individual page is not acquired from each of all of the scene image data groups but is acquired from only some scene image data groups. However, the third exemplary embodiment is not limited to this configuration. For example, there is a case where the number of pieces of image data suitable for spread data for individual page is small. In such a case, for example, image data used for spread data for individual page can be acquired from each of all of the scene image data groups. Moreover, image data used for spread data for common page can be configured not to be acquired from all of the scene image data groups but to be acquired from only some scene image data groups. With this, while a sufficient number of pieces of image data used for spread data for individual page are secured, an image selected as an image for common page and an image selected as an image for individual page can be prevented or reduced from becoming the same.

In the above-described exemplary embodiments, album data is generated without a page corresponding to a cover and the other pages being distinguished from each other. In a fourth exemplary embodiment, album data is generated with a page corresponding to a cover and the other pages being distinguished from each other. Additionally, in the fourth exemplary embodiment, a configuration in which a page corresponding to a cover is controlled to be a common page and a configuration in which a page corresponding to a cover is controlled to be an individual page are described.

Furthermore, unless otherwise stated, the configuration of the fourth exemplary embodiment is assumed to be similar to the configuration of the first exemplary embodiment.

Figure 14A:
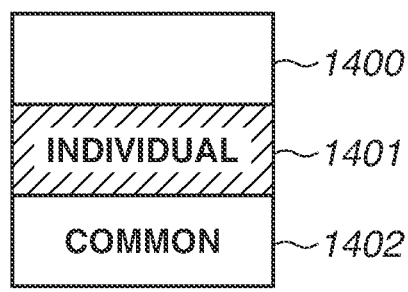
FIGS. 14A and 14B are diagrams used to explain a cover setting area.

In the fourth exemplary embodiment, the album creation application further displays, on the setting screen 301, a cover mode setting area 1400 for receiving setting of a mode for cover, such as that illustrated in FIG. 14A. An area 1401 is an area for selecting an individual mode as the mode for cover, and an area 1402 is an area for selecting a common mode as the mode for cover. The individual mode is a mode to perform control in such a manner that a page corresponding to a cover is an individual page, and the common mode is a mode to perform control in such a manner that a page corresponding to a cover is a common page. Furthermore, while the mode for cover selected here is applied to all of the albums designated to be created via the setting screen 301, the fourth exemplary embodiment is not limited to this, and the mode for cover can be selected for each album.

FIGS. 13A, 13B, 13C, and 13D are flowcharts illustrating automatic layout processing which is performed by the album creation application according to the fourth exemplary embodiment. The flowcharts illustrated in FIGS. 13A to 13D are implemented, for example, by the CPU 101 loading a program corresponding to the album creation application stored in the HDD 104 onto the ROM 102 or the RAM 103 and executing the program.

Processing in steps S401 to S411 is similar to the processing described above in the first exemplary embodiment.

In step S1301, the CPU 101 performs cover data generation processing for determining a layout of the cover and generating cover data used to print the cover with the determined layout. Furthermore, in the fourth exemplary embodiment, the cover data is assumed to be data used to print pages respectively corresponding to a front cover and a back cover. However, the fourth exemplary embodiment is not limited to this configuration, and, for example, the cover data can be data used to print a page corresponding to only a front cover. FIG. 13D is a flowchart illustrating cover data generation processing which is performed by the album creation application according to the fourth exemplary embodiment.

In step S130101, the CPU 101 specifies cover data of which album to generate out of a plurality of albums designated to be created via the setting screen 301.

In step S130102, the CPU 101 specifies a mode for cover of the album specified in step S130101 based on an input entered by the user in the cover mode setting area 1400.

In step S130103, the CPU 101 acquires cover candidate image data serving as a candidate for image data to be arranged in a cover of the album specified in step S130101.

Specifically, in a case where the mode for cover of the album specified in step S130101 is the individual mode, the CPU 101 acquires, as cover candidate image data, image data included in spread data corresponding to an individual page out of pieces of spread data generated in step S411. Then, in a case where the mode for cover of the album specified in step S130101 is the common mode, the CPU 101 acquires, as cover candidate image data, image data included in spread data corresponding to a common page out of pieces of spread data generated in step S411.

In step S130104, the CPU 101 selects image data to be arranged in the cover from the cover candidate image data. In the fourth exemplary embodiment, since the number of pieces of image data to be arranged in the cover is one, the CPU 101 selects only one piece of image data. Specifically, in a case where the mode for cover of the album specified in step S130101 is the individual mode, the CPU 101 selects image data the score for individual page of which is high from the cover candidate image data. Furthermore, the score for individual page to be referred to at this time is a score for individual page evaluated based on a main subject set in the album specified in step S130101. Moreover, in a case where the mode for cover of the album specified in step S130101 is the common mode, the CPU 101 selects image data the score for common page of which is high from the cover candidate image data. Furthermore, if a plurality of pieces of image data is to be arranged in the cover, a plurality of pieces of image data can be selected in step S130104.

Furthermore, while, in the above description, image data to be arranged in the cover is selected from pieces of image data included in spread data generated in step S411, the fourth exemplary embodiment is not limited to this configuration. As long as image data to be selected is image data corresponding to the mode for cover (i.e., the score corresponding to the mode for cover is high), image data that is not included in spread data generated in step S411 can be selected.

Moreover, image data can be selected based on a factor other than a score corresponding to the mode for cover. For example, image data in which only a subject image is shown can be selected in preference to image data in which a person other than a main subject is shown. Moreover, image data conforming to the design or aspect ratio of a slot arranged in a template for cover can be selected in preference to image data not conforming thereto. Moreover, image data the resolution of which becomes greater than or equal to a predetermined value when the image data is arranged in a slot can be preferentially selected.

Figure 15A:
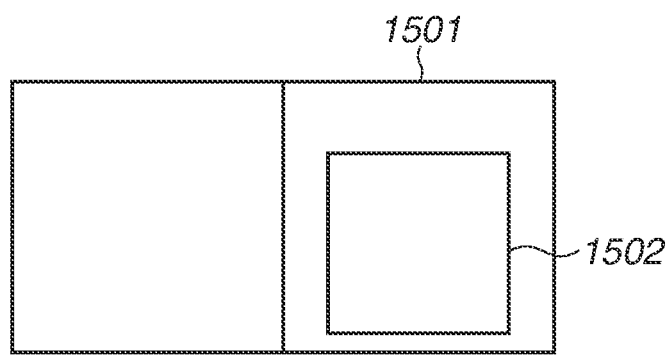
FIGS. 15A, 15B, 15C, and 15D are diagrams illustrating examples of templates for cover.
Figure 15B:
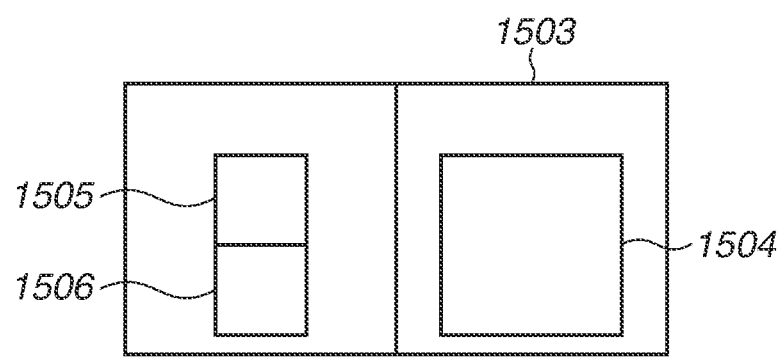
Figure 15C:
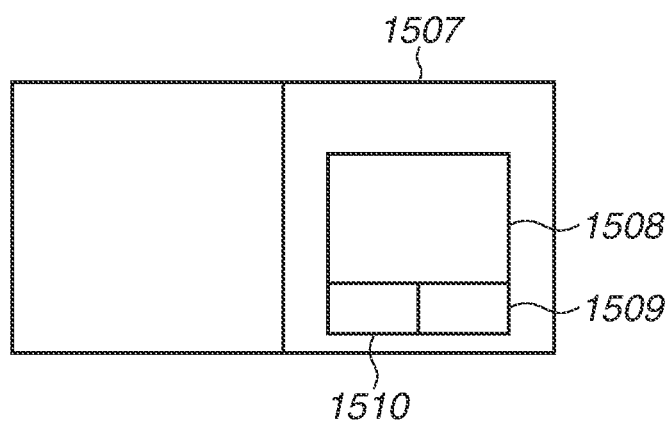
Figure 15D:
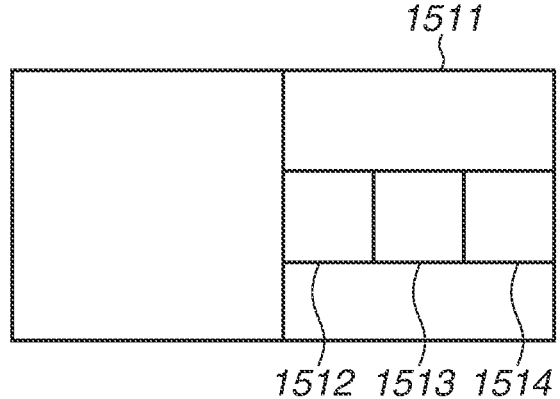

In step S130105, the CPU 101 acquires a template for cover. In the fourth exemplary embodiment, only one template for cover is assumed to be previously prepared. An example of the template for cover acquired in step S130105 is illustrated in FIG. 15A. In the templates for cover illustrated in FIGS. 15A, 15B, 15C, and 15D, a region on the right side of the central line is a region corresponding to a front cover, and a region on the left side of the central line is a region corresponding to a back cover. For example, a slot 1502 is arranged in a region corresponding to the front cover of the template for cover 1501, and any slot is not arranged in a region corresponding to the back cover of the template for cover 1501. Furthermore, in step S130105, a plurality of templates for cover different in type from each other can be acquired. Moreover, a slot can also be arranged in a region corresponding to the back cover. Furthermore, the templates for cover such as those illustrated in FIGS. 15A to 15D and the templates for page other than templates for cover such as those illustrated in FIG. 9 are assumed to be different from each other in the layout such as the size of each slot or the number of slots. Moreover, a region in which to arrange text such as an album name can be provided in a template for cover.

In step S130106, the CPU 101 generates cover data. Specifically, the CPU 101 generates cover data by arranging the image data selected in step S130104 in a slot of the template acquired in step S130105. Furthermore, in a case where a plurality of templates for cover has been acquired in step S130105, the CPU 101 can determine which of the acquired plurality of templates for cover to use or in which slot to arrange which of pieces of image data, in a similar way to the processing illustrated in FIG. 8. Furthermore, in a case where a slot is also arranged in a region corresponding to the back cover, the CPU 101 also arranges the image data selected in step S130104 in the slot arranged in the region corresponding to the back cover. Furthermore, for example, even in a case where the mode for cover is the common mode, image data for individual page (image data the score for individual page of which is high) can be arranged in the slot arranged in the region corresponding to the back cover.

In step S130107, the CPU 101 determines whether generation of cover data has been completed with respect to all of the albums designated to be created via the setting screen 301. If it is determined that the generation of cover data has not yet been completed (NO in step S130107), the CPU 101 returns the processing to step S130101, in which the CPU 101 specifies generating cover data of an album not yet subjected to generation of cover data. On the other hand, if it is determined that the generation of cover data has been completed (YES in step S130107), the CPU 101 advances the processing to step S1302.

In step S1302, the CPU 101 performs spread joining processing for joining the generated cover data and pieces of spread data and thus generating album data. While the present processing is similar to that in step S412 described in the first exemplary embodiment, the CPU 101 arranges the cover data and pieces of spread data in such a manner that the page number of a page corresponding to the front cover is the smallest and the page number of a page corresponding to the back cover is the largest and then joins the arranged cover data and pieces of spread data. At this time, although pieces of spread data other than the cover data are arranged based on the sort criterion value, the cover data is arranged irrespective of the sort criterion value. Moreover, in adjustment of the number of pieces of spread data, cover data is controlled in such a way as not to be targeted for deletion. After that, the CPU 101 advances the processing to step S413.

The subsequent processing is similar to the processing described in the first exemplary embodiment.

With the above-described configuration employed, album data can be generated with a page corresponding to a cover and the other pages distinguished from each other. Moreover, an image suitable for a cover can be arranged in a template for cover as an image to be included in the cover.

Furthermore, while, in the above description, a configuration in which the user is allowed to select the individual mode and the common mode has been described, the fourth exemplary embodiment is not limited to this configuration. For example, a configuration in which only a predetermined one of the individual mode and the common mode is used to generate cover data can also be employed. In that case, displaying a cover mode setting area to receive selection of the mode for cover from the user does not need to be performed.

In a fifth exemplary embodiment, a configuration for receiving setting of the mode for cover in more detail is described.

Furthermore, unless otherwise stated, the configuration of the fifth exemplary embodiment is assumed to be similar to the configuration of the first exemplary embodiment.

Figure 14B:
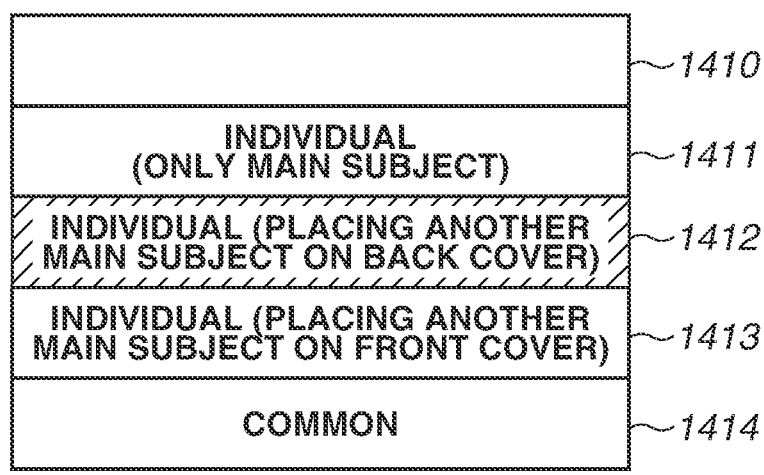

In the fifth exemplary embodiment, the album creation application further displays, on the setting screen 301, a cover mode setting area 1410 for receiving setting of the mode for cover, such as that illustrated in FIG. 14B. In the fifth exemplary embodiment, three areas (areas 1411 to 1413) are assumed to be included in areas used to select the individual mode as the mode for cover. The area 1411 is similar to the area 1401. The area 1412 is an area used to select an individual mode for placing, on the back cover, an image including a main subject set in another album. The area 1413 is an area used to select an individual mode for placing, on the front cover, an image including a main subject set in another album. An area 1414 is similar to the area 1402. Furthermore, while the mode for cover selected here is applied to all of the albums designated to be created via the setting screen 301, the fifth exemplary embodiment is not limited to this, and the mode for cover can be selected for each album.

The album data generation processing performed in a case where the area 1411 has been selected is similar to the album data generation processing performed in a case where the area 1401 has been selected. Moreover, the album data generation processing performed in a case where the area 1414 has been selected is similar to the album data generation processing performed in a case where the area 1402 has been selected.

Processing which is performed in a case where the area 1412 has been selected is described. In step S130104, the CPU 101 selects image data the score for individual page of which evaluated based on a main subject set in an album specified in step S130101 is high, as in the fourth exemplary embodiment. Then, additionally, the CPU 101 selects image data the score for individual page of which evaluated based on a main subject set in an album other than the album specified in step S130101 is high.

In step S130105, the CPU 101 acquires a template for cover 1503 (FIG. 15B) corresponding to the area 1412.

In step S130106, the CPU 101 places, in a slot 1504 in the front cover, the image data the score for individual page of which evaluated based on a main subject set in an album specified in step S130101 is high. Then, the CPU 101 places, in a slot 1505 and a slot 1506 in the back cover, the image data the score for individual page of which evaluated based on a main subject set in an album other than the album specified in step S130101 is high. This enables, while making a main subject set in an album specified in step S130101 conspicuous, increasing variations of layout in the back cover of the album.

The subsequent processing is similar to the processing described in the fourth exemplary embodiment.

Processing which is performed in a case where the area 1413 has been selected is described. In step S130104, the CPU 101 selects image data the score for individual page of which evaluated based on a main subject set in an album specified in step S130101 is high, as in the fourth exemplary embodiment. Then, additionally, the CPU 101 selects image data the score for individual page of which evaluated based on a main subject set in an album other than the album specified in step S130101 is high.

In step S130105, the CPU 101 acquires a template for cover 1507 (FIG. 15C) corresponding to the area 1413.

In step S130106, the CPU 101 places, in a slot 1508 in the front cover, the image data the score for individual page of which evaluated based on a main subject set in an album specified in step S130101 is high. Then, the CPU 101 places, in a slot 1509 and a slot 1510 in the front cover, the image data the score for individual page of which evaluated based on a main subject set in an album other than the album specified in step S130101 is high. The slot 1508 is large as compared with the slot 1509 or the slot 1510. This enables, while making a main subject set in an album specified in step S130101 conspicuous, increasing variations of layout in the front cover of the album.

The subsequent processing is similar to the processing described in the first exemplary embodiment.

In a sixth exemplary embodiment, a configuration for performing processing different from the processing performed in the above-described exemplary embodiments, as processing performed in a case where the common mode has been selected as a mode for cover, is described.

In the above-described exemplary embodiments, in a case where the mode for cover is the common mode, the CPU 101 selects image data the score for common page of which is high from the cover candidate image data. However, in the sixth exemplary embodiment, in a case where the mode for cover is the common mode, the CPU 101 selects a plurality of pieces of image data the score for individual page is high from the cover candidate image data. Specifically, for example, suppose that creation of three albums, i.e., an album in which a main subject A is set, an album in which a main subject B is set, and an album in which a main subject C is set, has been designated. In that case, in step S130104, the CPU 101 selects image data the score for individual page of which evaluated based on the main subject A is high, image data the score for individual page of which evaluated based on the main subject B is high, and image data the score for individual page of which evaluated based on the main subject C is high. Furthermore, the number of pieces of image data to be selected is not limited to three. Pieces of image data the number of which is larger than or equal to at least the number of albums designated to be created only needs to be selected.

In step S130105, the CPU 101 acquires a template for cover 1511 (FIG. 15D) for the common mode.

In step S130106, the CPU 101 places, in a slot 1512 to a slot 1514, the respective pieces of image data selected in step S130104. The sizes of the slot 1512 to the slot 1514 are assumed to be the same. Moreover, in which slot which piece of image data is placed is not particularly limited. For example, image data the score for individual page of which evaluated based on a main subject in an album specified in step S130101 is high can be placed in the slot 1513, which is located at the center of the front cover area.

In this way, in the sixth exemplary embodiment, a cover for the common mode is configured by placing, in the cover, a plurality of pieces of image data corresponding to the respective main subjects. Furthermore, in a case where the individual mode has been described as the mode for cover, as described in the fourth exemplary embodiment and the fifth exemplary embodiment, at least one piece of image data corresponding to one main subject is placed in the cover.

In the above-described exemplary embodiments, a configuration in which the number of pieces of spread data corresponding to an individual page differs depending on albums has been described. However, the exemplary embodiments are not limited to this configuration, and the number of pieces of spread data corresponding to an individual page can be controlled to be the same with respect to all of a plurality of albums designated by the user to be created.

In the above-described exemplary embodiments, a configuration in which the number of pieces of spread data corresponding to a common page differs depending on albums has been described. However, the exemplary embodiments are not limited to this configuration, and the number of pieces of spread data corresponding to a common page can be controlled to be the same with respect to all of a plurality of albums designated by the user to be created.

In the above-described exemplary embodiments, an aggregation of pieces of spread data for common page and pieces of spread data for individual page is sorted according to the sort criterion value, so that album data is generated. Thus, in which position (page number) spread data for common page or spread data for individual page is placed in album data differs for each piece of album data. However, the exemplary embodiments are not limited to this configuration, and, for example, the position of spread data for common page and the position of spread data for individual page can be fixed in each piece of album data. For example, pieces of spread data can be arranged in such a manner that spread data for individual page is placed after spread data for common page. In more detail, pieces of spread data can be arranged in such a manner that pieces of spread data for individual page sorted according to the sort criterion value are placed after pieces of spread data for common page sorted according to the sort criterion value. Naturally, pieces of spread data can also be arranged in such a manner that spread data for common page is placed after spread data for individual page.

The above-described exemplary embodiments can also be implemented by performing the following processing. More specifically, software (program) for implementing the functions of the above-described exemplary embodiments is supplied to a system or apparatus via a network or any type of storage medium, and a computer (or a CPU or micro processing unit (MPU)) of the system or apparatus reads out and executes the program to perform the processing. Moreover, the program can be executed by a single computer or can be executed by a plurality of computers operating in conjunction with each other. Moreover, not all of the above-described processing operations need to be implemented by software, but a part or all of the above-described processing operations can be implemented by hardware such as an application specific integrated circuit (ASIC). Moreover, the CPU includes not only a single CPU performing all of the processing operations but also a plurality of CPUs performing the processing operations in cooperation with each other as appropriate.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036830 filed Feb. 28, 2019, which is hereby incorporated by reference herein in its entirety.

What is claimed is:

1. A control method for an image processing apparatus that generates a plurality of pieces of album data corresponding to a plurality of albums, the control method comprising:
　acquiring a plurality of pieces of image data;
　evaluating each of the plurality of pieces of image data based on a first factor;
　evaluating each of the plurality of pieces of image data based on a second factor different from the first factor;
　automatically selecting at least one piece of image data out of the plurality of pieces of image data as common image data corresponding to an image to be placed in a common page, which is a page common to all of the plurality of albums, based on an evaluation that is based on the first factor;
　generating common page data corresponding to the common page based on the at least one piece of image data selected as the common image data;
　automatically selecting at least one piece of image data out of the plurality of pieces of image data as individual image data corresponding to an image to be placed in an individual page, which is a page not common to all of the plurality of albums, based on an evaluation that is based on the second factor;
　generating a plurality of pieces of individual page data corresponding to the individual page based on the at least one piece of image data selected as the individual image data; and
　generating the plurality of pieces of album data based on the common page data and the plurality of pieces of individual page data,
　wherein the individual page data corresponding to first album data out of the plurality of pieces of album data and the individual page data corresponding to second album data out of the plurality of pieces of album data are different from each other, and
　wherein the common page data corresponding to the first album data out of the plurality of pieces of album data and the common page data corresponding to the second album data out of the plurality of pieces of album data are identical to each other.

2. The control method according to claim 1,
　wherein each of the plurality of pieces of image data is evaluated by the second factor concerning the first album data and the second factor concerning the second album data,
　wherein at least one piece of image data out of the plurality of pieces of image data is automatically selected as the individual image data corresponding to the first album data based on an evaluation that is based on the second factor concerning the first album data,
　wherein at least one piece of image data out of the plurality of pieces of image data is automatically selected as the individual image data corresponding to the second album data based on an evaluation that is based on the second factor concerning the second album data,
　wherein the individual page data corresponding to the first album data is generated based on the at least one piece of image data selected as the individual image data corresponding to the first album data,
　wherein the individual page data corresponding to the second album data is generated based on the at least one piece of image data selected as the individual image data corresponding to the second album data,
　wherein the album data corresponding to the first album data is generated based on the common page data and the individual page data corresponding to the first album data, and
　wherein the album data corresponding to the second album data is generated based on the common page data and the individual page data corresponding to the second album data.

3. The control method according to claim 2, further comprising specifying at least one main subject respectively corresponding to the plurality of pieces of album data,
　wherein the first factor includes a factor concerning the at least one main subject corresponding to the first album data and a factor concerning the at least one main subject corresponding to the second album data,
　wherein the second factor concerning the first album data includes a factor concerning the at least one main subject corresponding to the first album data and does not include a factor concerning the at least one main subject corresponding to the second album data, and
　wherein the second factor concerning the second album data includes a factor concerning the at least one main subject corresponding to the second album data and does not include a factor concerning the at least one main subject corresponding to the first album data.

4. The control method according to claim 3,
　wherein the first factor includes a factor concerning a size of the at least one main subject corresponding to the first album data and a factor concerning a size of the at least one main subject corresponding to the second album data,
　wherein the second factor concerning the first album data includes a factor concerning a size of the at least one main subject corresponding to the first album data and does not include a factor concerning a size of the at least one main subject corresponding to the second album data, and
　wherein the second factor concerning the second album data includes a factor concerning a size of the at least one main subject corresponding to the second album data and does not include a factor concerning a size of the at least one main subject corresponding to the first album data.

5. The control method according to claim 3,
wherein the first factor includes a factor concerning whether the at least one main subject corresponding to the first album data is included and a factor concerning whether the at least one main subject corresponding to the second album data is included,
wherein the second factor concerning the first album data includes a factor concerning whether the at least one main subject corresponding to the first album data is included and does not include a factor concerning whether the at least one main subject corresponding to the second album data is included, and
wherein the second factor concerning the second album data includes a factor concerning whether the at least one main subject corresponding to the second album data is included and does not include a factor concerning whether the at least one main subject corresponding to the first album data is included.

6. The control method according to claim 3,
wherein the first factor includes a factor concerning whether the at least one main subject corresponding to the first album data is a smiling subject and a factor concerning whether the at least one main subject corresponding to the second album data is a smiling subject,
wherein the second factor concerning the first album data includes a factor concerning whether the at least one main subject corresponding to the first album data is a smiling subject and does not include a factor concerning whether the at least one main subject corresponding to the second album data is a smiling subject, and
wherein the second factor concerning the second album data includes a factor concerning whether the at least one main subject corresponding to the second album data is a smiling subject and does not include a factor concerning whether the at least one main subject corresponding to the first album data is a smiling subject.

7. The control method according to claim 2, wherein each of the first factor and the second factor includes a factor concerning image quality.

8. The control method according to claim 1, further comprising:
segmenting the plurality of pieces of image data into a plurality of image data groups according to a predetermined criterion;
specifying at least one image data group out of the plurality of image data groups as a common image data group for selecting the common image data; and
specifying at least one image data group out of the plurality of image data groups as an individual image data group for selecting the individual image data,
wherein at least one piece of image data out of the at least one image data group specified as the common image data group is selected as the common image data, and
wherein at least one piece of image data out of the at least one image data group specified as the individual image data group is selected as the individual image data.

9. The control method according to claim 8, wherein at least one image data group out of the at least one image data group specified as the common image data group is controlled in such a way as not to be specified as the individual image data group.

10. The control method according to claim 9, wherein all of the image data groups out of the at least one image data group specified as the common image data group is controlled in such a way as not to be specified as the individual image data group.

11. The control method according to claim 9,
wherein all of the image data groups out of the plurality of image data groups are specified as the common image data group, and
wherein at least one image data group out of the plurality of image data groups is not specified as the individual image data group.

12. The control method according to claim 1,
wherein a first evaluation value is appended to the plurality of pieces of image data based on an evaluation that is based on the first factor,
wherein a second evaluation value is appended to the plurality of pieces of image data based on an evaluation that is based on the second factor,
wherein at least one piece of image data out of the plurality of pieces of image data is automatically selected as the common image data based on the first evaluation value, and
wherein at least one piece of image data out of the plurality of pieces of image data is automatically selected as the individual image data based on the second evaluation value.

13. The control method according to claim 12,
wherein at least one piece of image data to which the first evaluation value larger than that of a different piece of image data has been appended out of the plurality of pieces of image data is automatically selected as the common image data, and
wherein at least one piece of image data to which the second evaluation value larger than that of a different piece of image data has been appended out of the plurality of pieces of image data is automatically selected as the individual image data.

14. The control method according to claim 13,
wherein at least one piece of image data to which the first evaluation value larger than that of a different piece of image data has been appended and to which the first evaluation value larger in value than the second evaluation value has been appended out of the plurality of pieces of image data is automatically selected as the common image data, and
wherein at least one piece of image data to which the second evaluation value larger than that of a different piece of image data has been appended and to which the second evaluation value larger in value than the first evaluation value has been appended out of the plurality of pieces of image data is automatically selected as the individual image data.

15. The control method according to claim 1, further comprising performing control in such a manner that cover data corresponding to a cover serves as the common page data.

16. The control method according to claim 1, further comprising performing control in such a manner that cover data corresponding to a cover serves as the individual page data.

17. The control method according to claim 1, further comprising receiving an input entered by a user concerning cover data corresponding to a cover,
wherein cover data corresponding to a cover is controlled in such a way as to serve as data that is based on the input out of the common page data and the individual page data.

18. The control method according to claim 1,
wherein the common page data is generated by the at least one piece of image data selected as the common image data being automatically placed in a first template without reception of a placing operation performed by a user, and wherein the individual page data is generated by the at least one piece of image data selected as the individual image data being automatically placed in a second template without reception of a placing operation performed by a user.

19. The control method according to claim 1, further comprising outputting the plurality of pieces of album data, wherein outputting of the plurality of pieces of album data is at least one of displaying of the plurality of pieces of album data, transmission of the plurality of pieces of album data, and printing of the plurality of albums that is based on the plurality of pieces of album data.

20. A non-transitory computer-readable storage medium storing computer-executable instructions that, when executed by a computer of an image processing apparatus that generates a plurality of pieces of album data corresponding to a plurality of albums, cause the computer to perform a method comprising:

acquiring a plurality of pieces of image data;

evaluating each of the plurality of pieces of image data based on a first factor;

evaluating each of the plurality of pieces of image data based on a second factor different from the first factor;

automatically selecting at least one piece of image data out of the plurality of pieces of image data as common image data corresponding to an image to be placed in a common page, which is a page common to all of the plurality of albums, based on an evaluation that is based on the first factor;

generating common page data corresponding to the common page based on the at least one piece of image data selected as the common image data;

automatically selecting at least one piece of image data out of the plurality of pieces of image data as individual image data corresponding to an image to be placed in an individual page, which is a page not common to all of the plurality of albums, based on an evaluation that is based on the second factor;

generating a plurality of pieces of individual page data corresponding to the individual page based on the at least one piece of image data selected as the individual image data; and generating the plurality of pieces of album data based on the common page data and the plurality of pieces of individual page data, wherein the individual page data corresponding to first album data out of the plurality of pieces of album data and the individual page data corresponding to second album data out of the plurality of pieces of album data are different from each other, and wherein the common page data corresponding to the first album data out of the plurality of pieces of album data and the common page data corresponding to the second album data out of the plurality of pieces of album data are identical to each other.

* * * * *